United States Patent
Ryu et al.

(10) Patent No.: US 10,420,120 B2
(45) Date of Patent: Sep. 17, 2019

(54) METHOD FOR TRANSMITTING UPLINK FRAME IN WIRELESS LAN SYSTEM AND WIRELESS DEVICE USING THE SAME

(71) Applicant: LG ELECTRONICS INC., Seoul (KR)

(72) Inventors: Kiseon Ryu, Seoul (KR); Suhwook Kim, Seoul (KR); Jeongki Kim, Seoul (KR); Hyunhee Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 15/671,678

(22) Filed: Aug. 8, 2017

(65) Prior Publication Data

US 2018/0176929 A1 Jun. 21, 2018

Related U.S. Application Data

(60) Provisional application No. 62/434,416, filed on Dec. 15, 2016, provisional application No. 62/442,446, (Continued)

(51) Int. Cl.
*H04W 52/02* (2009.01)
*H04W 72/10* (2009.01)
(Continued)

(52) U.S. Cl.
CPC .......... *H04W 72/10* (2013.01); *H04L 5/0055* (2013.01); *H04L 5/0094* (2013.01); (Continued)

(58) Field of Classification Search
CPC ............. H04W 72/10; H04W 72/0413; H04W 74/0833; H04W 74/0808; H04W 28/0278; (Continued)

(56) References Cited

U.S. PATENT DOCUMENTS

| 8,619,658 B2 * | 12/2013 | Sammour | ............. H04J 3/0605 370/312 |
| 9,681,377 B2 * | 6/2017 | Sammour | ............. H04J 3/0605 |

(Continued)

OTHER PUBLICATIONS

"IEEE P802.11ax™/D1.0 Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Enhancements for High Efficiency WLAN", 802.11 Working Group of the LAN/MAN Standards Committee of the IEEE Computer Society, 2016, pp. 1-427.

*Primary Examiner* — William D Cumming
(74) *Attorney, Agent, or Firm* — Birch, Stewart, Kolasch & Birch, LLP

(57) ABSTRACT

A method for transmitting an uplink frame in a wireless local area network (WLAN) system. The method includes receiving, by a first wireless device, a basic trigger frame for an uplink multi-user (UL MU) transmission from a second wireless device, in which the basic trigger frame includes preference information related to an Access Category (AC) type for an aggregation frame that is to be generated by the first wireless device and limit information related to a maximum number of traffic identifiers allowed for the aggregation frame; generating, by the first wireless device, the aggregation frame with a plurality of Quality of Service (QoS) data frames of the first wireless device based on the preference information and the limit information; generating, by the first wireless device, the uplink frame based on the aggregation frame and a QoS null frame set to a no acknowledgement (ACK) policy regardless of the preference information and the limit information, in which the QoS null frame is not required to be acknowledged by the second wireless device based on the no ACK policy; and (Continued)

transmitting, by the first wireless device, the uplink frame to the second wireless device in response to the basic trigger frame.

11 Claims, 22 Drawing Sheets

Related U.S. Application Data filed on Jan. 5, 2017, provisional application No. 62/501,067, filed on May 3, 2017, provisional application No. 62/490,640, filed on Apr. 27, 2017.

(51) Int. Cl.
*H04W 72/04* (2009.01)
*H04W 74/06* (2009.01)
*H04L 5/00* (2006.01)
*H04W 84/12* (2009.01)
*H04L 29/12* (2006.01)
*H04W 72/08* (2009.01)

(52) U.S. Cl.
CPC ..... *H04W 72/0413* (2013.01); *H04L 61/6022* (2013.01); *H04W 72/087* (2013.01); *H04W 84/12* (2013.01)

(58) Field of Classification Search
CPC ........... H04W 74/002; H04W 74/0816; H04W 52/02; H04W 72/04; H04W 74/0875; H04W 74/06

USPC ...................................................... 455/343.2
See application file for complete search history.

(56) References Cited

U.S. PATENT DOCUMENTS

| 9,900,871 | B1* | 2/2018 | Ryu | H04W 72/0413 |
|---|---|---|---|---|
| 2007/0037548 | A1* | 2/2007 | Sammour | H04W 52/0235 |
| | | | | 455/343.2 |
| 2008/0232287 | A1* | 9/2008 | Shao | H04W 52/0216 |
| | | | | 370/311 |
| 2014/0112230 | A1* | 4/2014 | Sammour | H04J 3/0605 |
| | | | | 370/311 |
| 2017/0064708 | A1* | 3/2017 | Noh | H04W 74/0816 |
| 2017/0207893 | A1* | 7/2017 | Meylan | H04W 28/16 |
| 2017/0238254 | A1* | 8/2017 | Sammour | H04J 3/0605 |
| | | | | 370/311 |
| 2017/0318518 | A1* | 11/2017 | Kim | H04W 74/002 |
| 2018/0007661 | A1* | 1/2018 | Chun | H04L 1/1861 |
| 2018/0020373 | A1* | 1/2018 | Viger | H04W 28/0278 |
| 2018/0020460 | A1* | 1/2018 | Hedayat | H04L 27/2602 |
| 2018/0176929 | A1* | 6/2018 | Ryu | H04W 72/10 |
| 2018/0192444 | A1* | 7/2018 | Park | H04W 74/0808 |
| 2018/0205441 | A1* | 7/2018 | Asterjadhi | H04W 74/06 |
| 2018/0255570 | A1* | 9/2018 | Patil | H04W 74/0833 |
| 2018/0255589 | A1* | 9/2018 | Patil | H04W 52/146 |
| 2019/0069237 | A1* | 2/2019 | Sammour | H04J 3/0605 |

\* cited by examiner

FIG. 1
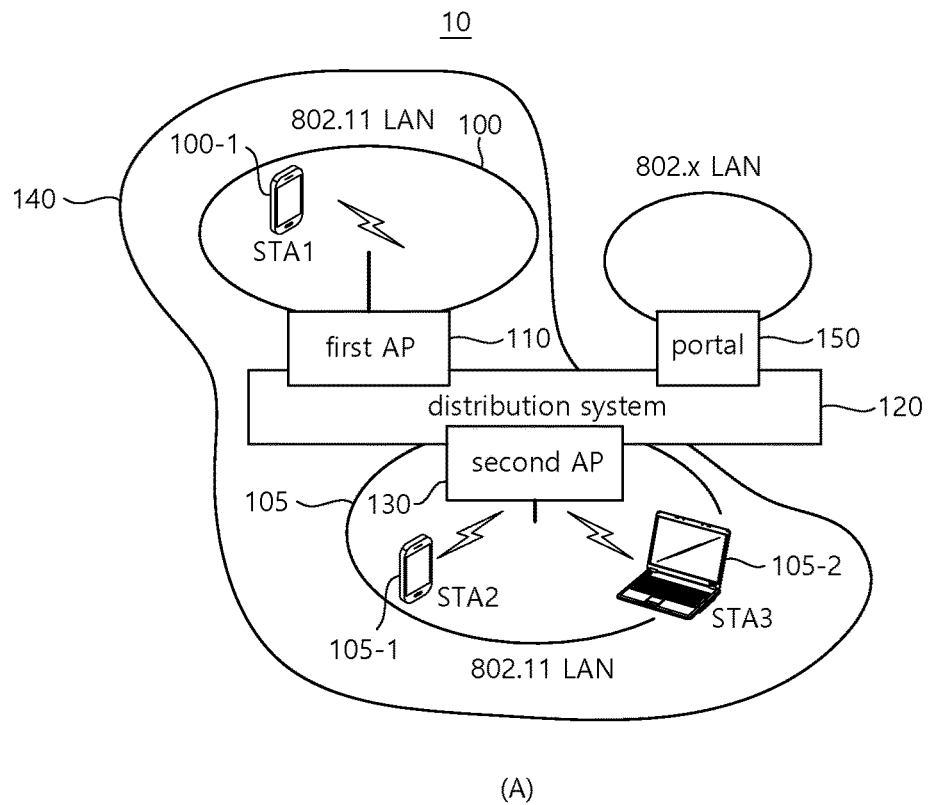
(A)
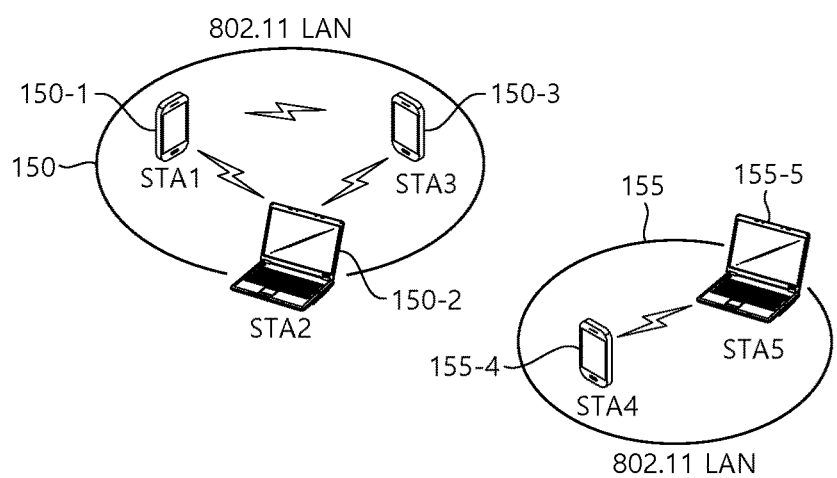
(B)

METHOD FOR TRANSMITTING UPLINK FRAME IN WIRELESS LAN SYSTEM AND WIRELESS DEVICE USING THE SAME

CROSS-REFERENCE TO RELATED APPLICATION

Pursuant to 35 U.S.C. § 119(e), this application claims the benefit of U.S. Provisional Applications No. 62/434,416, filed on Dec. 15, 2016, No. 62/442,446, filed on Jan. 5, 2017 and No. 62/501,067, filed on May 3, 2017, the contents of which are all hereby incorporated by reference herein in their entirety. In addition, the present application further claims priority benefit of U.S. Provisional Application No. 62/490,640, filed Apr. 27, 2017 under 35 U.S.C. § 119(e).

TECHNICAL FIELD

The present invention relates to wireless communication and, most particularly, to a method for transmitting an uplink frame in a wireless LAN system and a wireless device using the same.

BACKGROUND

The main goals of the next-generation WLAN are 1) to improve an institute of electronic and electronics engineers (IEEE) 802.11 physical (PHY) layer and a medium access control (MAC) layer in bands of 2.4 GHz and 5 GHz, 2) to increase spectrum efficiency and area throughput, and 3) to improve performance in actual indoor and outdoor environments, such as an environment in which an interference source exists, a dense heterogeneous network environment, an environment in which a high user load exists, and so on.

The environment that is mainly considered in the next-generation WLAN is a dense environment, wherein numerous access points (APs) and stations (STAs) exist, and improvement of spectrum efficiency and area throughput in such dense environment is being discussed. Moreover, in addition to the improvement of the indoor environment, improvement of actual performance in outdoor environments, which were not deeply considered in the legacy WLAN, is being taken into consideration in the next generation WLAN.

More specifically, scenarios, such as wireless offices, smart homes, stadiums, and Hotspots, are being considered in the next generation WLAN. Based on the corresponding scenarios, discussions are being carried out on the improvement in the performance of a wireless LAN system in environment, wherein APs and STAs are densely located.

SUMMARY OF THE INVENTION

A method for transmitting an uplink frame in a wireless LAN system according to an exemplary embodiment of the present invention may include the steps of receiving, by a first wireless device, a basic trigger frame individually allocating a plurality of uplink wireless resources for a plurality of user devices from a second wireless device, wherein the basic trigger frame may include preference information indicating an Access Category (AC) type for an aggregation traffic that is to be configured by the first wireless device and limit information indicating a maximum number of traffic identifiers allowed for the aggregation traffic, configuring, by the first wireless device, the aggregation traffic in accordance with the preference information and the limit information based on a plurality of Quality of Service (QoS) data frames for the first wireless device, and configuring, by the first wireless device, an uplink frame based on the aggregation traffic and a QoS null frame including ACK policy information being configured so that acknowledgement is not required by the second wireless device, wherein the QoS null frame may be included in the uplink frame regardless of the preference information and the limit information.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
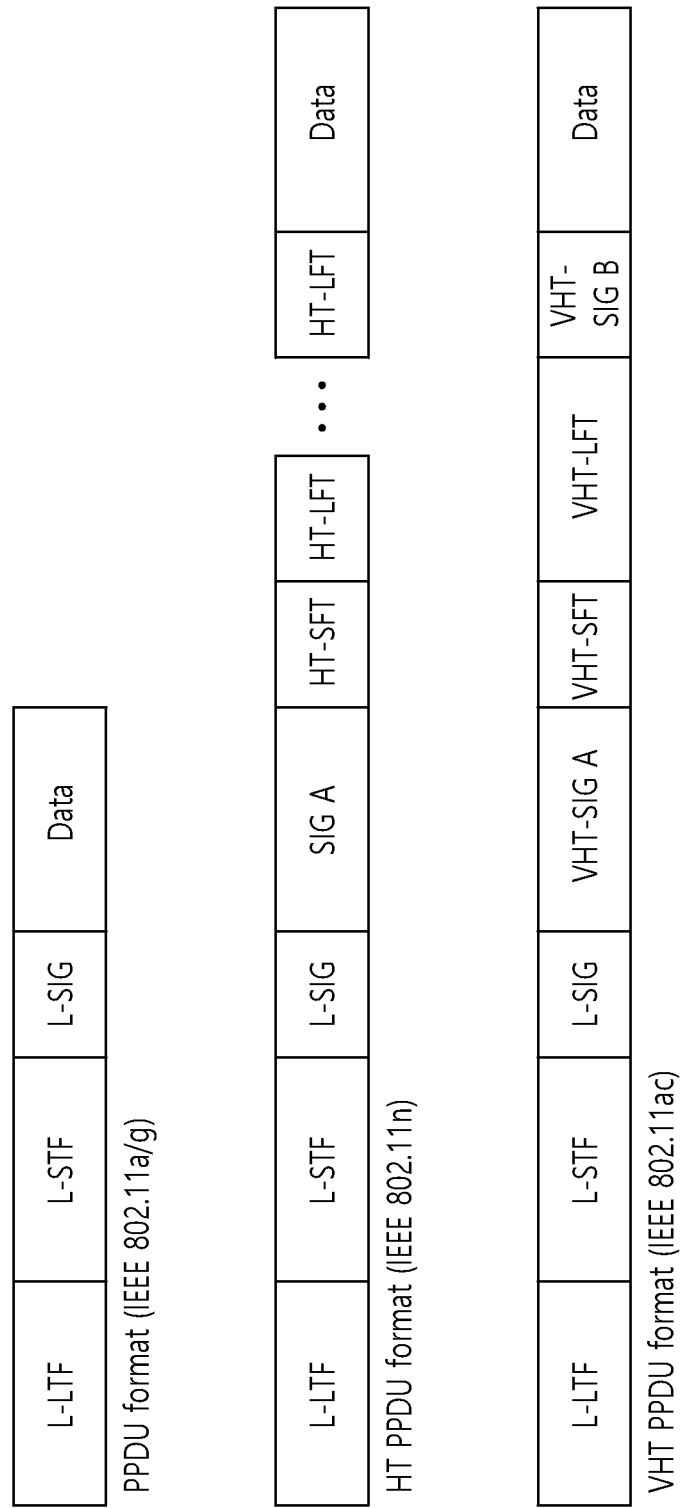
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also includes complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the wireless LAN system 10 of the FIG. 1(A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1(A), a network between the APs 110 and 130 and a network between the APs 110 and 130 and the STAs 100-1, 105-1, and 105-2 may be implemented.

FIG. 1(B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
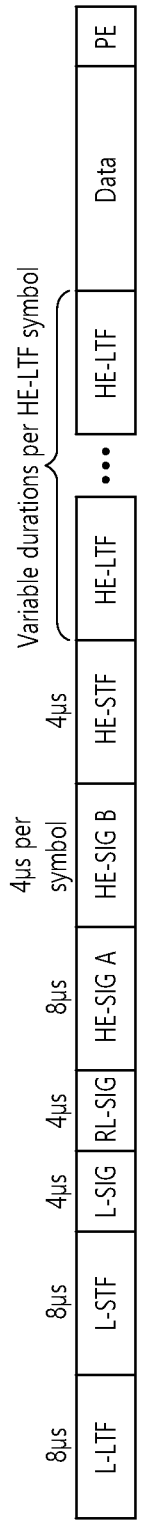
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
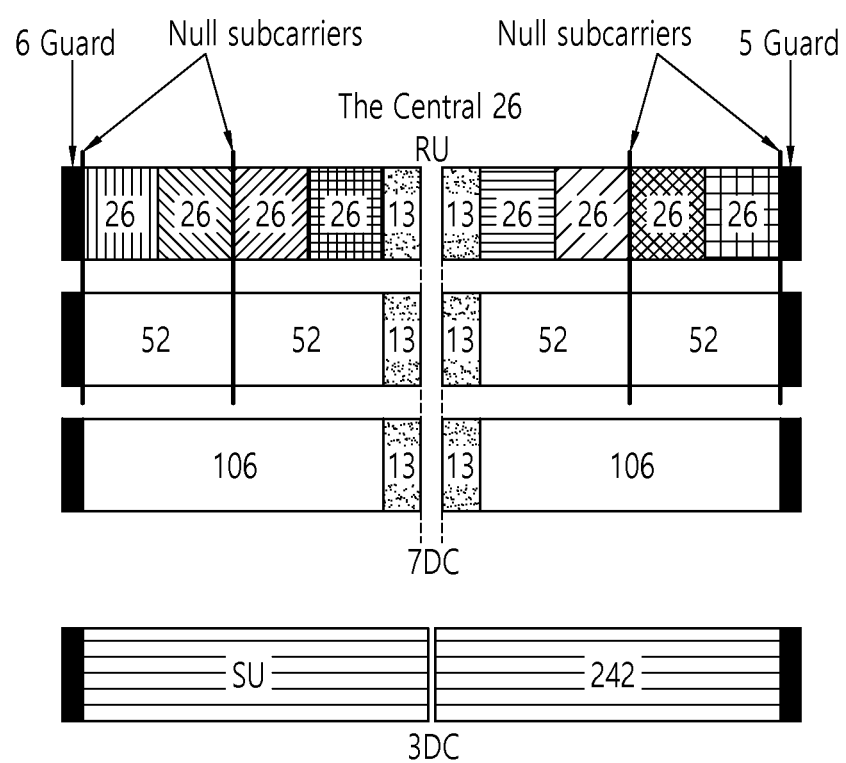
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
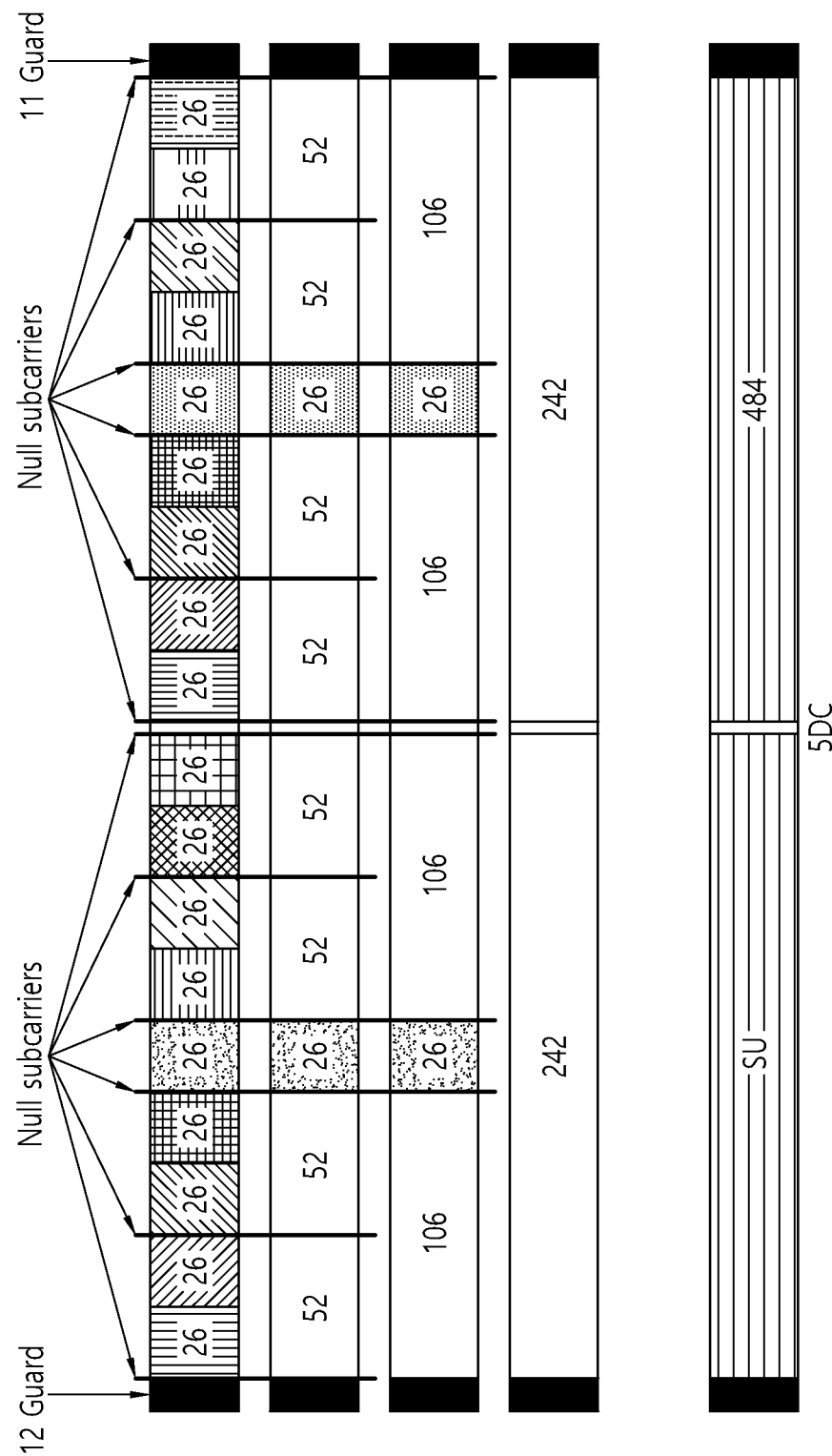
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
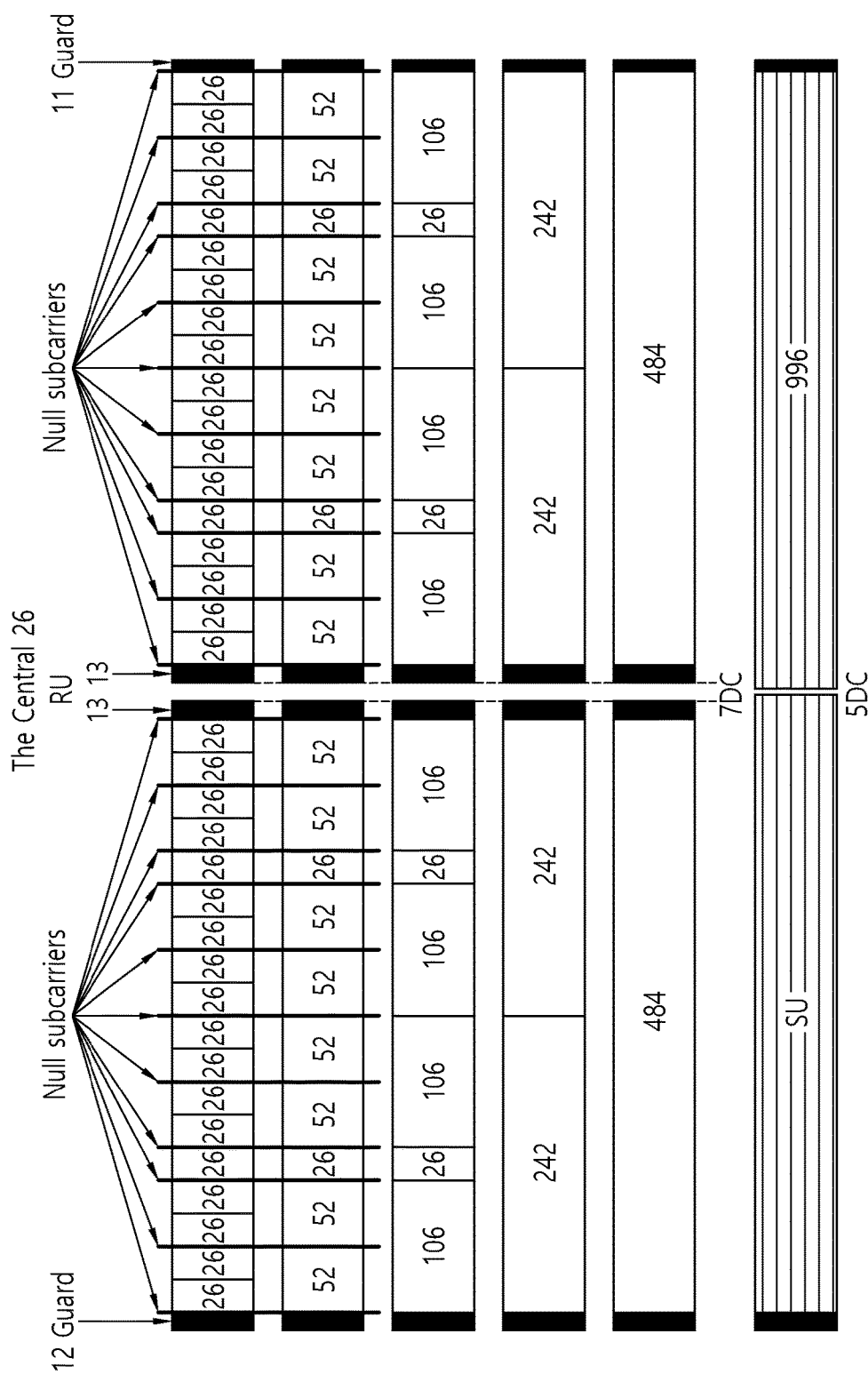
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
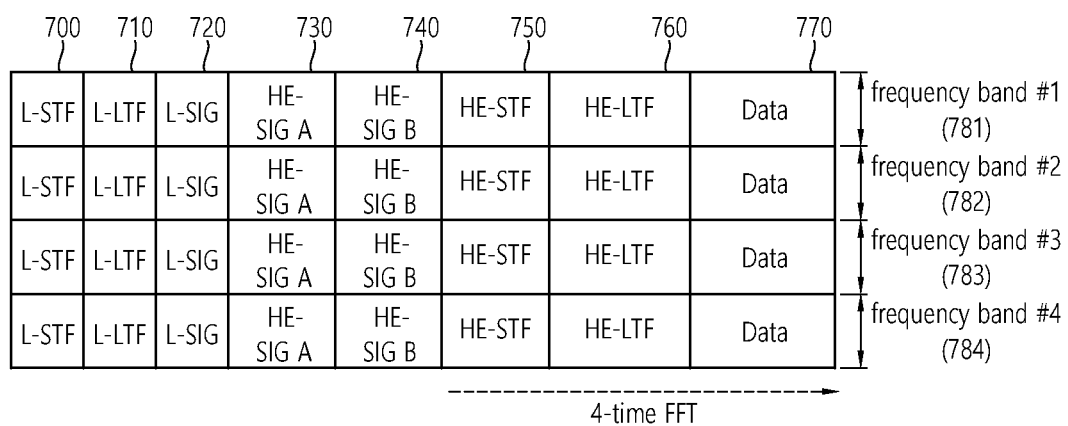
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
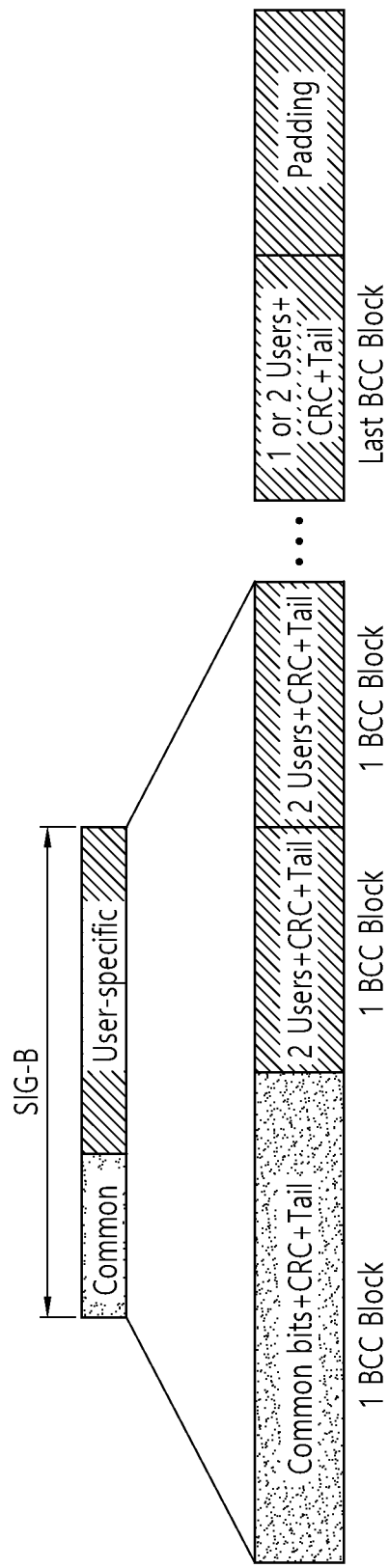
FIG. 8 is a block diagram illustrating one example of HE-SIG-B.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
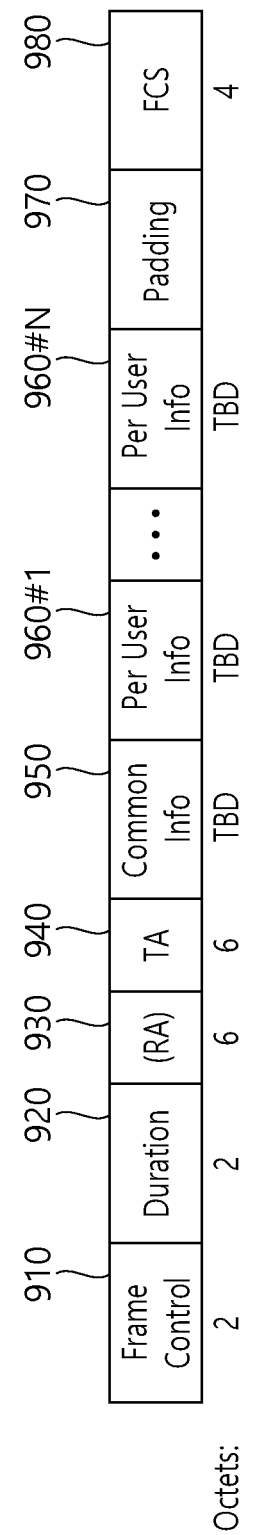
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
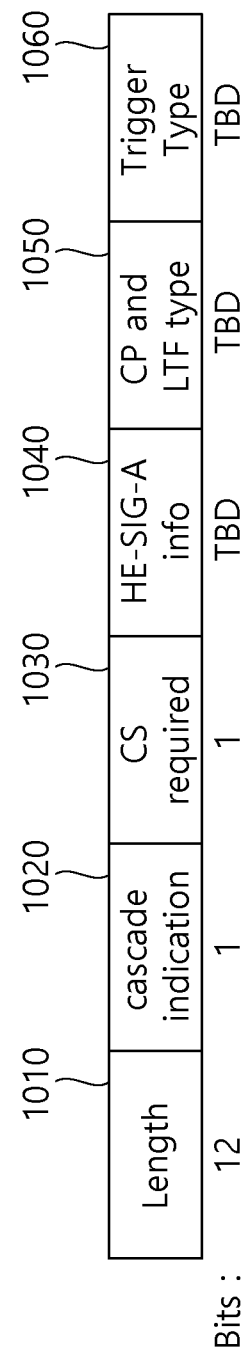
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
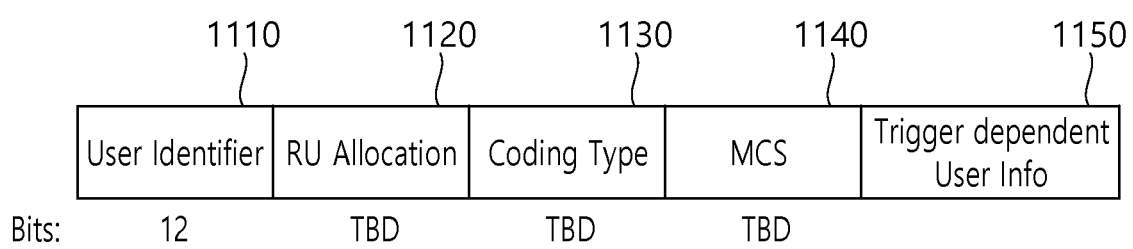
FIG. 11 illustrates an example of a sub-field being included in a per user information.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'.

Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding may is applied to the uplink PPDU, the coding type field 1130 may be set to '1', and when the LDPC coding is applied, the coding type field 1130 may be set to '0'.

In this specification, the trigger type field 1060 of the trigger frame may be configured to indicate a basic type trigger frame for performing general triggering. In this specification, the basic type trigger frame may be mentioned as a basic trigger frame.

Also, in this specification, the basic trigger frame may be interpreted and understood as a variant of the trigger frame. The basic trigger frame may further include a trigger dependent user information (Trigger dependent User Info) field 1150 in individual user information fields 960#1 to 960#N.

The Trigger dependent User Info field 1150 will be described in more detail later on with reference to FIG. 18.

Figure 12:
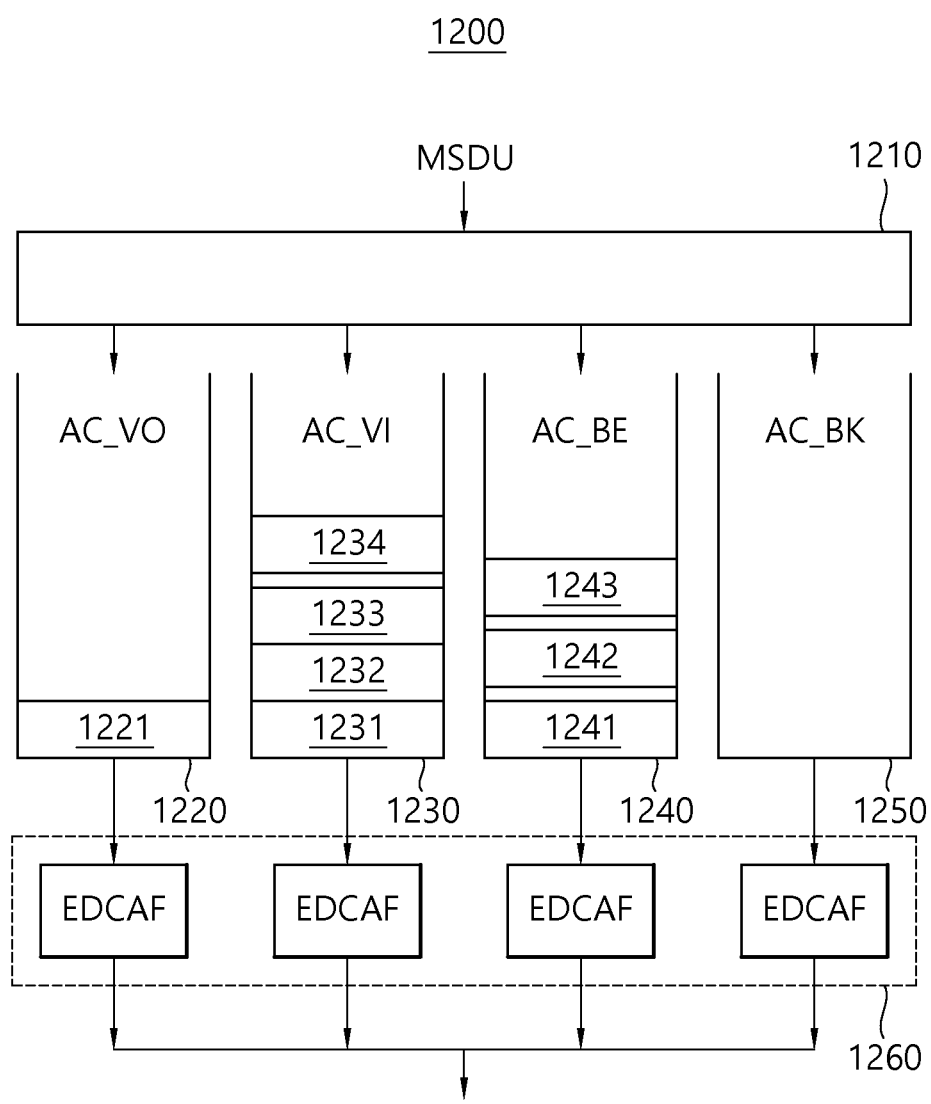
FIG. 12 is a diagram illustrating an EDCA based channel access method in a wireless LAN system.

FIG. 12 is a diagram illustrating an EDCA based channel access method in a wireless LAN system. In a wireless LAN system, an STA (or AP) may perform channel access in accordance with a plurality of user priority levels that are defined for enhanced distributed channel access (EDCA).

More specifically, in order to transmit a quality of service (QoS) data frame that is based on the plurality of user priority levels, four access categories (ACs) (i.e., background (AC_BK), best effort (AC_BE), video (AC_VI), and voice (AC_VO)) may be defined.

The STA may receive traffic data (e.g., a MAC service data unit (MSDU)) having a predetermined user priority level from a higher layer (e.g., a logical link control (LLC) layer).

For example, in order to determine the transmission order of the MAC frame that is to be transmitted by the STA, a differential value may be configured for each set of traffic data in the user priority level. The user priority level may be mapped to each access category (AC), wherein the traffic data are buffered, by using the method shown in Table 1.

TABLE 1

| Priority level | User priority level | Access Category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

In this specification, the user priority level may be understood as a Traffic identifier (hereinafter referred to as 'TID') indicating the characteristics of traffic data.

Referring to Table 1, traffic data having a user priority level (i.e., TID) of '1' or '2' may be buffered to a transmission queue 1250 of the AC_BK type. Traffic data having a user priority level (i.e., TID) of '0' or '3' may be buffered to a transmission queue 1240 of the AC_BE type.

Traffic data having a user priority level (i.e., TID) of '4' or '5' may be buffered to a transmission queue 1230 of the AC_VI type. And, traffic data having a user priority level (i.e., TID) of '6' or '7' may be buffered to a transmission queue 1220 of the AC_VO type.

Instead of DCF interframe space (DIFS), CWmin, and CWmax, which correspond to parameters for a backoff procedure that is based on the legacy distributed coordination function (DCF), a set (or group) of EDCA parameters, which corresponds to arbitration interframe space (AIFS) [AC], CWmin[AC], CWmax[AC], and TXOP limit[AC] may be used.

A difference in transmission priority levels may be implemented based on a set of differential EDCA parameters. An example of default values of the set of EDCA parameters (i.e., AIFS[AC], CWmin[AC], CWmax[AC], TXOP limit [AC]) corresponding to each AC may be as shown below in Table 2.

TABLE 2

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

The set of EDCA parameters for each AC may be configured to have default values or may be loaded in beacon frame so as to be transmitted from an AP to each STA. As values of AIFS[AC] and CWmin[AC] become smaller, the corresponding priority level may become higher, and, accordingly, channel access delay may become shorter, thereby enabling a larger number of bands to be used in the given traffic environment.

The set of EDCA parameters may include information on the channel access parameters (e.g., AIFS[AC], CWmin [AC], CWmax[AC]) for each AC.

The backoff procedure for EDCA may be performed based on a set of EDCA parameters, each being individually configured for 4 ACs included in each STA. An adequate configuration of EDCA parameter values defining different channel access parameters for each AC may optimize network performance and may, at the same time, increase the transmission effect, which results from the priority level of the traffic.

Therefore, in order to ensure equal (or fair) media access for all STAs participating in the network, the AP of the wireless LAN system should be capable of performing overall management and coordination functions corresponding to the EDCA parameters.

Referring to FIG. 12, one STA (or AP) 1200 may include a virtual mapper 1210, a plurality of transmission queues 1220 to 1250, and a virtual collision handler 1260. The virtual mapper 1210 of FIG. 12 may perform a function of mapping an MSDU that is received from a logical link control (LLC) layer to transmission queues corresponding to each AC in accordance with the Table 1, which is presented above.

The plurality of transmission queues 1220 to 1250 may perform the functions of individual EDCA contention entities for wireless media access within an STA (or AP). For example, the transmission queue 1220 of the AC_VO type of FIG. 12 may include one frame 1221 for a second STA (not shown).

The transmission queue 1230 of the AC_VI type may include 3 frames 1231 to 1233 for a first STA (not shown) and one frame 1234 for a third STA in accordance with a transmission order by which the frames are to be transmitted to a physical layer.

The transmission queue 1240 of the AC_BE type of FIG. 12 may include one frame 1241 for a second STA (not shown), and one frame 1242 for a third STA (not shown) and one frame 1243 for a second STA (not shown) in accordance with a transmission order by which the frames are to be transmitted to a physical layer.

As an example, the transmission queue 1250 of the AC_BK type of FIG. 12 may not include a frame that is to be transmitted to a physical layer.

For example, the frame 1221 included in the transmission queue 1220 of the AC_VO type of FIG. 12 may be interpreted and understood as one MAC Protocol Data Unit (MPDU) that is concatenated with a plurality of traffic data (i.e., MSDUs), which are received from a higher layer (i.e., LLC layer).

Also, the frame 1221 included in the transmission queue 1220 of the AC_VO type of FIG. 12 may be interpreted and understood as one MPDU that is concatenated with a plurality of traffic data (i.e., MSDUs) having the traffic identifier (TID) of any one of '6' and '7'.

The frame 1231 included in the transmission queue 1230 of the AC_VI type of FIG. 12 may be interpreted and understood as one MAC Protocol Data Unit (MPDU) that is concatenated with a plurality of traffic data (i.e., MSDUs), which are received from a higher layer (i.e., LLC layer).

Also, the frame 1231 included in the transmission queue 1230 of the AC_VI type of FIG. 12 may be interpreted and understood as one MPDU that is concatenated with a plurality of traffic data (i.e., MSDUs) having the traffic identifier (TID) of any one of '4' and '5'.

Similarly, each of the other frames 1232, 1233, and 1234 included in the transmission queue 1230 of the AC_VI type may be interpreted and understood as one MPDU that is concatenated with a plurality of traffic data (i.e., MSDUs) having the traffic identifier (TID) of any one of '4' and '5'.

Furthermore, the frame 1241 included in the transmission queue 1240 of the AC_BE type may be interpreted and understood as one MPDU that is concatenated with a plurality of traffic data (i.e., MSDUs) having the traffic identifier (TID) of any one of '0' and '3'.

Similarly, each of the other frames 1242 and 1243 included in the transmission queue 1240 of the AC_BE type may be interpreted and understood as one MPDU that is concatenated with a plurality of traffic data (i.e., MSDUs) having the traffic identifier (TID) of any one of '0' and '3'.

Each of the frames 1221, 1231 to 1234, and 1241 to 1243 may be interpreted and understood as a frame that does not exceed a predetermined traffic size.

In case one or more ACs having completed the backoff at the same time exist(s), the collision between the ACs may be coordinated in accordance with an EDCA function (EFCAF) included in the virtual collision handler 1260.

More specifically, by transmitting the frame included in the AC having the higher priority level, among the ACs that collide with one another, the problem of collision within the STA may be resolved. In this case, another AC may increase its contention window, and, then, the other AC may update its backoff counter with a newly selected backoff value based on the increased contention window.

A transmission opportunity (TXOP) may be initiated when a channel is accessed in accordance with an EDCA rule. When two or more frames are accumulated in one AC, and if an EPCA TXOP is acquired, the AC of an EDCA MAC layer may attempt to perform multiple frame transmissions. If the STA has already transmitted one frame, and if the STA is also capable of receiving the transmission of a next frame existing in the same AC within the remaining TXOP time and along with its ACK, the STA may attempt to perform the transmission of the corresponding frame after an SIFS time interval.

A TXOP limit value may be configured as a default value in the AP and the STA, and a frame that is related to the TXOP limit value may be transported (or delivered) to the STA from the AP.

If the size of the data frame that is to be transmitted exceeds the TXOP limit value, the AP may perform fragmentation on the corresponding frame into a plurality of smaller frames. Subsequently, the fragmented frames may be transmitted within a range that does not exceed the TXOP limit value.

Figure 13:
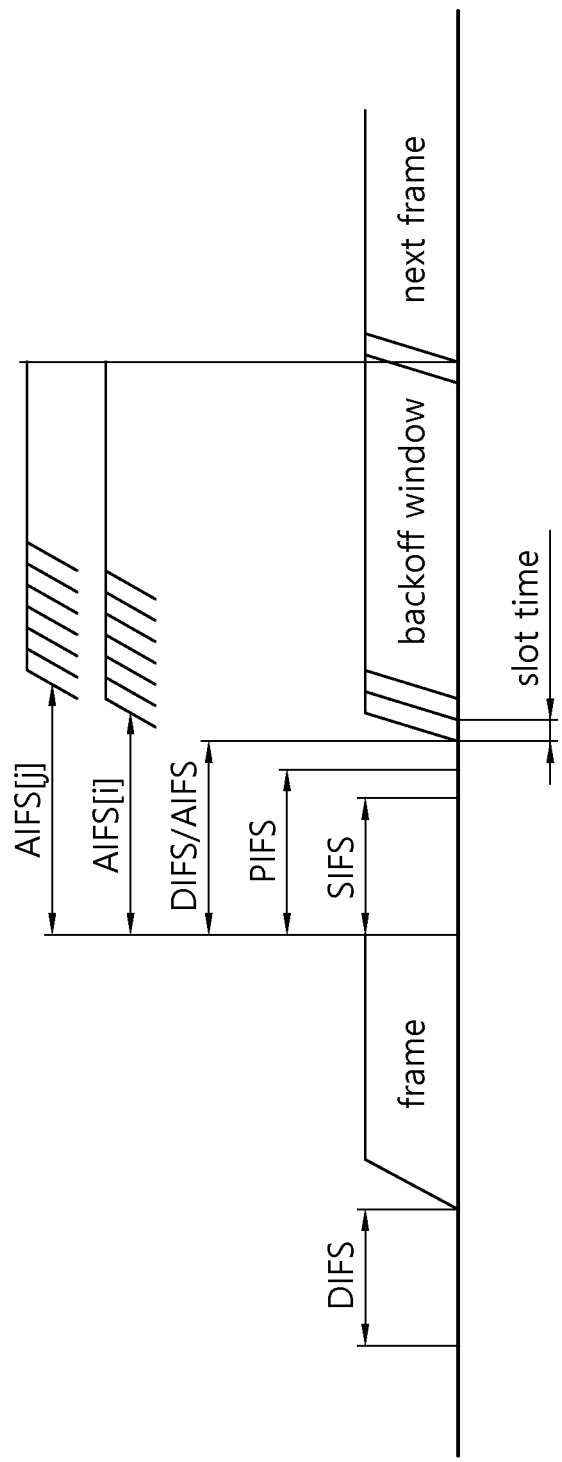
FIG. 13 is a conceptual view illustrating a backoff procedure of an EDCA.

FIG. 13 is a conceptual view illustrating a backoff procedure of an EDCA.

A plurality of STAs may share a wireless medium based on a distributed coordination function (hereinafter referred to as 'DCF'). In order to control the collision between STAs, the DCF may use a carrier sense multiple access/collision avoidance (hereinafter referred to as CSMA/CA) as its access protocol.

In a channel access method using the DCF, if a medium is not used during one DCF inter frame space (DIFS) (i.e., if the channel is idle) the STA may transmit an MPDU that is internally determined.

When it is determined by the carrier sensing mechanism that the wireless medium is used by another STA (i.e., that the channel is busy), the STA may determine the size of the contention window (hereinafter referred to as 'CW') and may then perform a backoff procedure.

In order to perform the backoff procedure, each STA may configure a backoff value, which is arbitrarily selected within the contention window (CW), in the backoff counter. In this specification, the time indicating the backoff value, which is selected by each STA, may be interpreted and understood as the backoff window shown in FIG. 13.

By counting down the backoff window in slot time units, each STA may perform a backoff procedure for channel access. Among the plurality of STAs, an STA that has selected the relatively shortest backoff window may acquire a transmission opportunity (hereinafter referred to as 'TXOP'), which corresponds to an authority to occupy a medium.

During a time period (or time section) for the TXOP, the remaining STAs may suspend their countdown operations. The remaining STAs may go on standby (or enter a standby mode) until the time period for the TXOP is ended. After the time period for the TXOP is ended, the remaining STAs may resume their countdown operations, which were suspended earlier.

By using the transmission method that is based on such DCF, the problem of collision, which may occur when a plurality of STAs transmit frames simultaneously, may be prevented. However, the channel access method using DCF does not have the concept of transmission priority levels (i.e., user priority levels). More specifically, when using the DCF, the quality of service (QoS) of the traffic that is intended to be transmitted by the STA cannot be ensured.

In order to resolve this problem, a hybrid coordination function (hereinafter referred to as 'HCF'), which is new coordination function, has been defined in 802.11e. The newly defined HCF has a capability (or performance) that is more enhanced than the channel access performance (or capability) of the legacy DCF. For the purposed of enhancing the QoS, the HCF may also use two different types of channel access methods, which correspond to a HCF controlled channel access (HCCA) of a polling method and a contention based enhanced distributed channel access (EDCA).

Referring to FIG. 13, the STA assumes that EDCA is being performed for the transmission of traffic data that are buffered to the STA. Referring to Table 1, the user priority level configured for each set of traffic data may be differentiated to 8 levels.

Each STA may include 4 different types (AC_BK, AC_BE, AC_VI, AC_VO) of output queues being mapped to 8 levels of user priority levels shown in Table 1.

The STA according to the exemplary embodiment of the present invention may transmit traffic data based on an Arbitration Interframe Space (AIFS) corresponds to the user priority level instead of the DCF Interframe Space (DIFS), which was used in the legacy method.

Hereinafter, in the exemplary embodiment of the present invention, a user equipment may correspond to a device that is capable of supporting both a wireless LAN system and a cellular system. More specifically, the user equipment may be interpreted as a UE supporting a cellular system or an STA supporting a wireless LAN system.

In order to facilitate the description of this specifically, Inter-Frame Spacing, which is mentioned in 802.11, will be described. For example, Inter-Frame Spacing (IFS) may correspond to a reduced interframe space (RIFS), a short interframe space (SIFS), a PCF interframe space (PIFS), a DCF interframe space (DIFS), an arbitration interframe space (AIFS), or an extended interframe space (EIFS).

The Inter-Frame Spacing (IFS) may be determined in accordance with attributes specified by the physical layer of the STA regardless of the bit rate of the STA. Among the Inter-Frame Spacing (IFS), with the exception for the AIFS, the remaining IFS may be understood as a fixed value for each physical layer.

The AIFS may be configured of have a value corresponding to the 4 types of transmission queues that are mapped to the user priority level, as shown in Table 2.

The SIFS has the shortest time gap among the IFS mentioned above. Accordingly, the SIFS may be used when an STA occupying a wireless medium is required to maintain its occupation of the medium without any interruption by another STA during a section, wherein a frame exchange sequence is performed.

More specifically, by using the shortest gap between transmissions within a frame exchange sequence, priority may be assigned (or given) for completing the frame exchange sequence that is being performed. Also, an STA performing access to a wireless medium by using SIFS may immediately initiate transmission from an SIFS boundary without determining whether or not the medium is busy.

A duration of an SIFS for a specific physical (PHY) layer may be defined by a SIFSTime parameter. For example, in the physical (PHY) layer of the IEEE 802.11a, IEEE 802.11g, IEEE 802.11n, and IEEE 802.11ac standards (or specifications), the SIFS value is equal to 16 µs.

The PIFS may be used in order to provide the STA with a higher priority level following the SIFS. More specifically, the PIFS may be used in order to acquire a priority for accessing the wireless medium.

The DIFS may be used by an STA transmitting a data frame (MPDU) and a management frame (Mac Protocol Data Unit (MPDU)) based on the DCF.

After the received frame and backoff time are expired, when it is determined that the medium is in an idle state by a carrier sense (CS) mechanism, the STA may transmit a frame.

Figure 14:
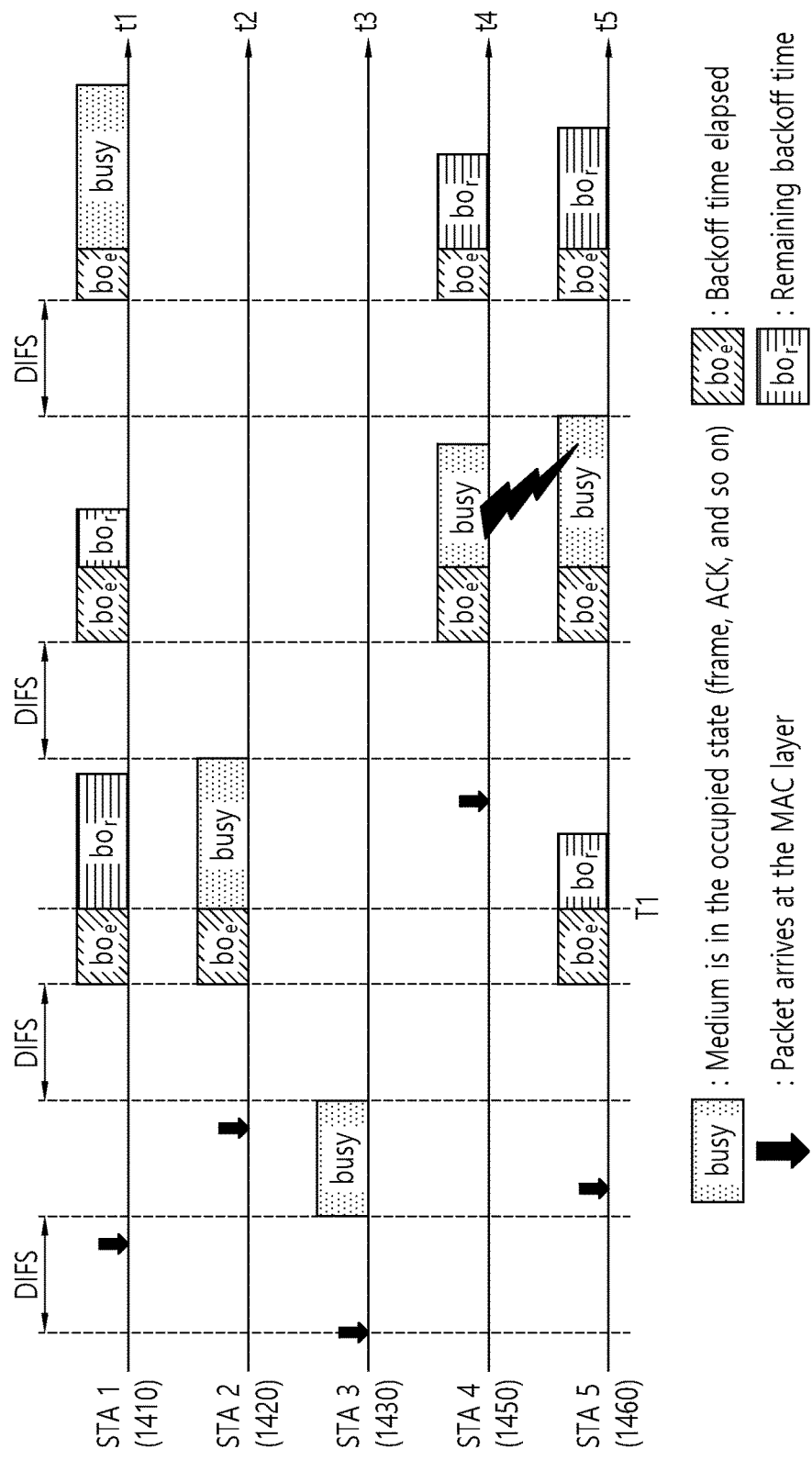
FIG. 14 is a diagram describing a transmission procedure of a frame in a wireless LAN system.

FIG. 14 is a diagram describing a transmission procedure of a frame in a wireless LAN system.

As described above each of the STAs 1410, 1420, 1430, 1440, and 1450 according to the exemplary embodiment of the present invention may individually select a backoff value of the backoff procedure.

Additionally, each STA 1410, 1420, 1430, 1440, and 1450 may attempt to perform transmission after going on standby for as long as a time period (i.e., backoff window of FIG. 13), which indicates the selected backoff value in slot time units.

Moreover, each STA 1410, 1420, 1430, 1440, and 1450 may perform countdown of a backoff window in slot time units. The countdown operations for channel access corresponding to the wireless medium may be individually performed by each STA.

Hereinafter, the time corresponding to the backoff window may be referred to as a random backoff time Tb[i]. In other words, each STA may individually configure a backoff time (Tb[i]) in the backoff counter of each STA.

More specifically, the backoff time Tb[i] corresponds to a pseudo-random integer value and may be calculated based on Equation 1 shown below.

$$T_b[i] = \text{Random}(i) \times \text{SlotTime} \quad \text{[Equation 1]}$$

Random(i) of Equation 1 refers to a function using uniform distribution and generating a random integer between 0 and CW[i]. CW[i] may be interpreted as a contention window that is selected between a minimum contention window CWmin[i] and a maximum contention window CWmax[i]. The minimum contention window CWmin[i] and the maximum contention window CWmax[i] may correspond to CWmin[AC] and CWmax[AC], which represent default values of Table 2.

In an initial channel access, the STA may set the CW[i] as a CWmin[i] and may select a random integer between 0 and CWmin[i]. In the exemplary embodiment of the present invention, the selected random integer may be referred to as a backoff value.

i may be interpreted and understood as a user priority level of the traffic data. i of Equation 1 may be interpreted and understood to correspond to any one of AC_VO, AC_VI, AC_BE, and AC_BK according to Table 1.

The SlotTime of Equation 1 may be used for providing sufficient time in order to allow the preamble of the transmitting STA to be sufficiently detected by a neighboring STA. The SlotTime of Equation 1 may be used for defining the PIFS and DIFS, which are mentioned above. For example, the SlotTime may be equal to 9 μs.

For example, in case the user priority level (i) is equal to '7', an initial backoff time for the transmission queue of the AC_VO type Tb[AC_VO] may correspond to a time indicating the backoff time, which is selected between 0 and CWmin[AC_VO], in SlotTime units.

In case collision occurs between STAs in accordance with the backoff procedure (or in case an ACK frame corresponding to the transmitted frame fails to be received), the STA may calculate the increased backoff time Tb[i]' based on Equation 2 shown below.

$$CW_{new}[i] = ((CW_{old}[i]+1) \times PF) - 1 \quad \text{[Table 2]}$$

Referring to Equation 2, a new contention window $CW_{new}[i]$ may be calculated based on a previous (or old) contention window. A PF value of Equation 2 may be calculated in accordance with a procedure that is defined in the IEEE 802.11e standard. For example, the PF value of Equation 2 may be configured to be equal to '2'.

In this exemplary embodiment, the increased backoff time Tb[i]' may be interpreted and understood as a time indicating a random integer (i.e., backoff value) that is selected between 0 and the new contention window $CW_{new}[i]$ in slot time units.

The CWmin[i], CWmax[i], AIFS[i], and PF values, which are mentioned in FIG. 14, may be signaled from the AP through a QoS parameter set element, which corresponds to a management frame. The values of CWmin[i], CWmax[i], AIFS[i], and PF may correspond to values that are predetermined by the AP and the STA.

Referring to FIG. 14, a horizontal axis for first to fifth STAs 1410 to 1450 may indicate a time axis. And, a vertical axis for the first to fifth STAs 1410 to 1450 may indicate the backoff time.

Referring to FIG. 13 and FIG. 14, if a state of a specific medium is changed from an idle state to a busy (or occupied) state, the plurality of STAs may attempt to perform data (or frame) transmission.

At this point, as a method for minimizing collision between STAs, each STA may select a backoff time Tb[i] of Equation 1 and may attempt to perform transmission after going on standby for as long as a slot time corresponding to the selected backoff time.

In case the backoff procedure is initiated, each STA may perform countdown of a backoff counter time, which is individually selected, in slot time units. Each STA may continuously monitor the medium while performing the countdown.

If the wireless medium is monitored while it is in an occupied state, the STA may suspend the countdown and may go on standby (or enter a standby mode). If the wireless medium is monitored while it is in an idle state, the STA may resume countdown.

Referring to FIG. 14, when a frame for the third STA 1430 reaches the MAC layer of the third STA 1430, the third STA 1430 may determine whether or not the medium is in an idle state during a DIFS. Subsequently, when it is determined that the medium is in the idle state during a DIFS, the third STA 1430 may transmit a frame to the AP (not shown). Herein, however, although the inter frame space (IFS) of FIG. 14 is illustrated as a DIFS, it should be understood that this specification will not be limited only to this.

While the frame is transmitted from the third STA 1430, the remaining STAs may verify the occupation status of the medium and may then enter a standby mode during the transmission period of the frame. The may reach the MAC layer corresponding to each of the first STA 1410, the second STA 1420, and the fifth STA 1450. If it is determined that the medium is in an idle state, each STA may be on standby for as long as a DIFS and may then perform countdown of a backoff time, which is individually selected by each STA.

FIG. 14 illustrates a case when the second STA 1420 selects the smallest (or shortest) backoff time and when the first STA 1410 selects the largest (or longest) backoff time. More specifically, FIG. 14 illustrates a case when the remaining backoff time of the fifth STA 1450 is shorter than the remaining backoff time of the first STA 1410, at a time point T1 of completing the backoff procedure corresponding to the backoff time, which is selected by the second STA 1420, and initiating the frame transmission.

When the medium is occupied by the second STA 1420, the first STA 1410 and the fifth STA 1450 may suspend the backoff procedure and go on standby. Subsequently, when the medium of the second STA 1420 occupation is ended (i.e., when the medium returns to its idle state), the first STA 1410 and the fifth STA 1450 may go on standby for as long as a DIFS.

Thereafter, the first STA 1410 and the fifth STA 1450 may resume their backoff procedures based on the suspended remaining backoff time. In this case, since the remaining backoff time of the fifth STA 1450 is shorter than the remaining backoff time of the first STA 1410, the fifth STA 1450 may complete the backoff procedure earlier than the first STA 1410.

Meanwhile, referring to FIG. 14, when the medium is occupied by the second STA 1420, a frame for the fourth STA 1440 may reach the MAC layer of the fourth STA 1440. When the medium enters (or returns to) the idle state, the fourth STA 1440 may go on standby for as long as a DIFS. Thereafter, the fourth STA 1440 may perform countdown of the backoff time, which is selected by the fourth STA 1440.

Referring to FIG. 14, the remaining backoff time of the fifth STA 1450 may coincidentally match with (or be identical to) the remaining backoff time of the fourth STA 1440. In this case, collision may occur between the fourth STA 1440 and the fifth STA 1450. If collision occurs between the STAs, both the fourth STA 1440 and the fifth STA 1450 may become incapable of receiving ACKs and may fail to perform data transmission.

Accordingly, the fourth STA 1440 and the fifth STA 1450 may individually calculate a new contention window $CW_{new}$ [i] in accordance with Equation 2, which is presented above. Subsequently, the fourth STA 1440 and the fifth STA 1450 may individually perform countdown of the backoff time, which is newly calculated in accordance with Equation 2.

Meanwhile, when then medium is in an occupied state due to the transmission of the fourth STA 1440 and the fifth STA 1450, the first STA 1410 may go on standby. Subsequently, if the medium enters (or returns to) the idle state, after being on standby for as long as a DIFS and may then resume the backoff counting. When the backoff time of the first STA 1410 is elapsed, the first STA 1410 may transmit a frame.

In addition to physical carrier sensing by which the AP and/or STA directly senses the medium, the CSMA/CA mechanism may also include virtual carrier sensing.

Virtual carrier sensing is used for compensating for any problems that may occur during access to the medium, such as a hidden node problem, and so on. For the virtual carrier sensing, the MAC of a WLAN system uses a Network Allocation Vector (NAV). Herein, the NAV corresponds to a value, which corresponds to the time remaining until the medium shifts to an available state, that is indicated by an AP and/or STA currently using or having the authority to use the medium to another AP and/or STA.

Therefore, the value that is configured as the NAV corresponds to a time period during which the usage of the medium by the AP and/or STA transmitting corresponding frame is scheduled, and, during the corresponding time period, medium access of the STA receiving the NAV value is prohibited.

Figure 15:
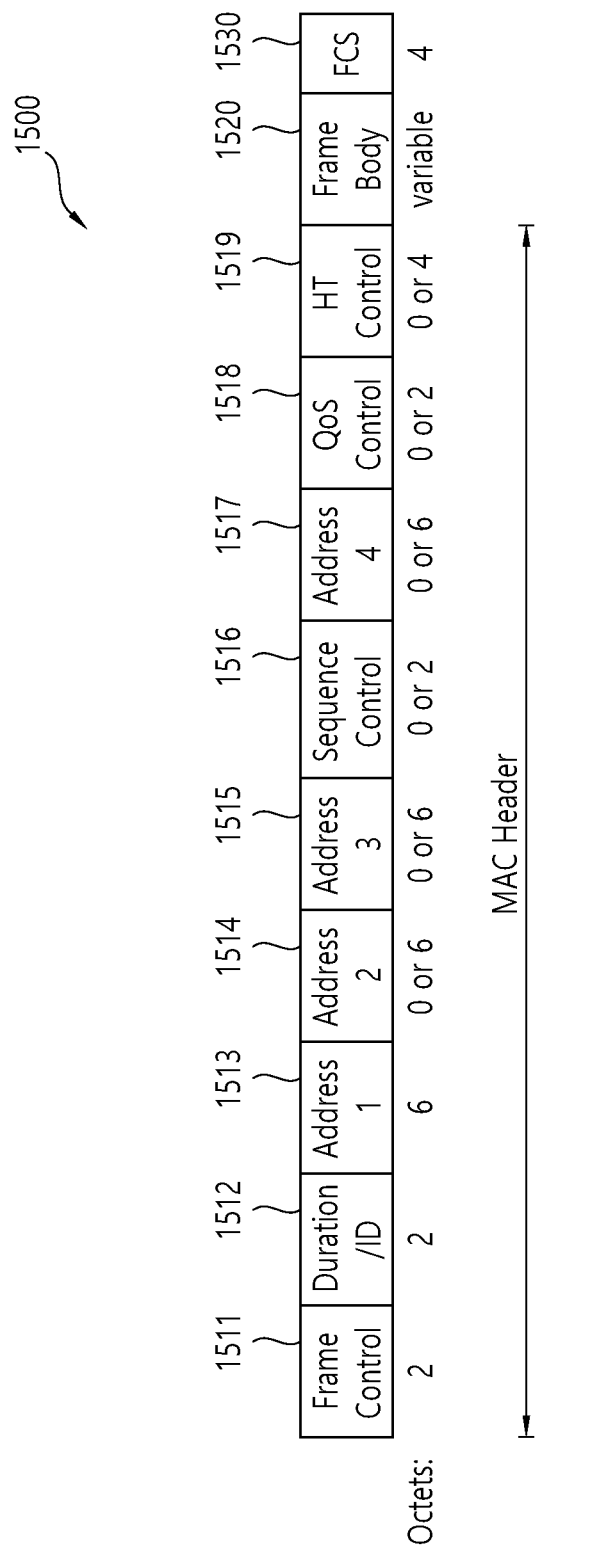
FIG. 15 illustrates an example of a MAC frame.

FIG. 15 illustrates an example of a MAC frame. In this specification, a MAC frame 1500 of FIG. 15 may be interpreted and understood as one MPDU.

Referring to FIG. 15, the MAC frame 1500 may include a plurality of fields 1511 to 1519 for the MAC header, a frame body field 1520 including a payload, and a FCS field 1530 for error detection of a receiving device. For example, the frame body field 1520 may have a variable length.

Among the plurality of fields 1511 to 1519 included in the MAC header, a frame control field 1511, a duration/ID field 1512, and a first address field 1513, and the FCS field 1530 may be included in all types of MAC frames.

A second address field 1514, a third address field 1515, a sequence control field 1516, a fourth address field 1517, a QoS control field 1518, a HT control field 1519, and a frame body field 1520 may be selectively included in accordance with the type of the MAC frame.

When a QoS data frame or a QoS null frame is indicated through the frame control field 1511, the QoS control field 1518 may be included in the MAC frame 1500.

In this specification, the QoS data frame may refer to a frame including a payload (e.g., MSDU) included in the frame body field 1520.

Additionally, the QoS null frame does not include a payload in the frame body field 1520 and may refer to a frame including control information in the MAC header 1511 to 1519.

The QoS control field 1518 may be configured of 2 octets (16 bits). The QoS control field 1518 may configured as shown below in Table 3.

TABLE 3

| Applicable frame (sub) types | Bits 0-3 | Bit 4 | Bits 5-6 | Bit 7 | Bits 8 Bit 9 Bit 10 Bits 11-15 |
|---|---|---|---|---|---|
| QoS Data and QoS Data CF-Ack frames sent by non-AP STAs that are not a TPU buffer STA or a TPU sleep STA in a nonmesh BSS | +TID<br><br>TID | 0<br><br>1 | Ack Policy<br><br>Ack Policy | A-MSDU Present<br><br>A-MSDU Present | TXOP Duration Requested<br><br>Queue Size |
| QoS Null frames sent by non-AP STAs that are not a TPU buffer STA or a TPU sleep STA in a nonmesh BSS | TID<br><br>TID | 0<br><br>1 | Ack Policy<br><br>Ack Policy | Reserved<br><br>Reserved | TXOP Duration Requested<br><br>Queue Size |

Referring to Table 3, first to fourth bits Bit0 to Bit3 may correspond to a region for a traffic identifier (hereinafter referred to as 'TID'). The traffic identifier (TID) may be mapped to '0' to '7' for the user priority levels shown in Table 1. The remaining values 8 to 15, which are expressed by the first to fourth bits Bit0 to Bit3, may correspond to reserved values.

The traffic identifier (TID), which corresponds to the traffic being buffered to the STA (or AP) may be delivered (or transported) through the first bit to the fourth bit Bit0 to Bit3 of the QoS control field 1518.

For example, if the fifth bit Bit4 of the QoS control field 1518 is set to '1', queue size information of the transmission queue corresponding to the traffic that is to be transmitted by the STA may be included in the ninth bit to sixteenth bit Bit8 to Bit15 of the QoS control field 1518.

Referring to FIG. 12 to FIG. 15, in case the traffic identifier (TID) of the buffered traffic 1221 is set to '6' or '7', the STA 1200 may indicate a queue size of the traffic 1221, which is buffered to the transmission 1220 of the AC_VO type, through the QoS control field 1518 of the MAC frame 1500.

As another example, in case the traffic identifier (TID) of the buffered traffic 1221 is set to '4' or '5', the STA 1200 may indicate a summed (or combined) queue size of the traffic 1231 to 1234 being buffered to the transmission queue 1230 of the AC_VI type.

Figure 16:
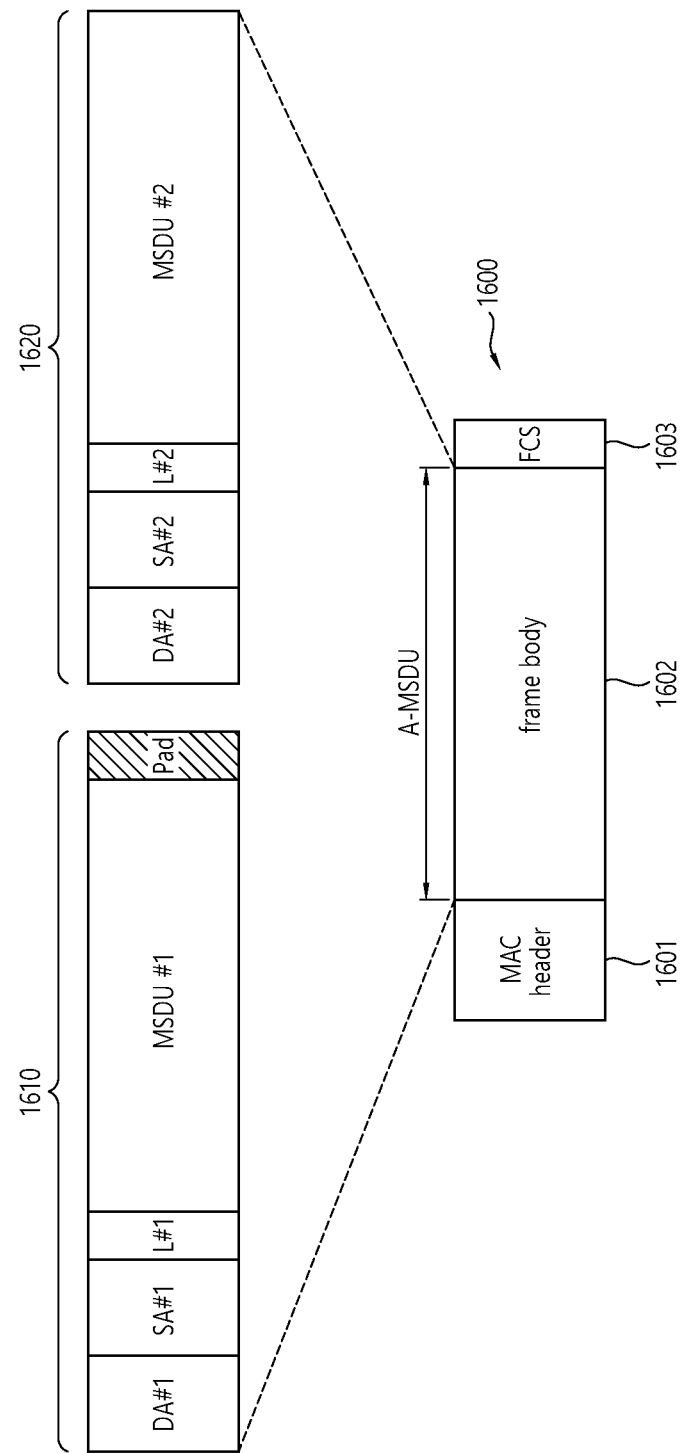
FIG. 16 is a conceptual view illustrating a frame structure of an MPDU that is generated based on a plurality of MSDUs according to an exemplary embodiment of the present invention.

FIG. 16 is a conceptual view illustrating a frame structure of an MPDU that is generated based on a plurality of MSDUs according to an exemplary embodiment of the present invention.

Referring to FIG. 1 to FIG. 16, the MPDU 1600 may correspond to the MAC frame 150 of FIG. 15. For example, the MPDU 1600 of the MAC header 1601 may correspond to the MAC header 1511 to 1519 of FIG. 15. A frame body field 1602 of the MPDU 1600 may correspond to the frame body field 1520 of FIG. 15. A FCS field 1603 of the MPDU 1600 may correspond to the FCS field 1530 of FIG. 15.

More specifically, a frame having two encapsulated MSDUs 1610 and 1620 aggregated therein may be included in the frame body field 1602 of FIG. 16.

For example, the first encapsulated MSDU 1610 may be generated based on a first payload (i.e., MSDU#1) that is received by the MAC layer from an LLC layer, which is a higher layer. For example, the first encapsulated MSDU 1610 may include a first subframe header having a predetermined size.

The first subframe header may include a first destination address Destination Address#1 (hereinafter referred to as 'DA#1'), a first source address Source Address#1 (hereinafter referred to as 'SA#1'), and a first length field (hereinafter referred to as 'L#1'), which indicates information on the length of a payload (i.e., MSDU#1).

Also, the first encapsulated MSDU 1610 may include a pad field having a predetermined size. The first encapsulated PSDU 1610 and the second encapsulated MSDU 1620 may be logically (or physically) differentiated from one another through the pad field.

It shall be understood that the description of the second encapsulated MSDU 1620 may be superseded by the description of the first encapsulated MSDU 1610.

The first payload (i.e., MSDU#1) and the second payload (i.e., MSDU#2) of FIG. 16 may be predetermined to have the same user priority level.

It may be assumed that the MPDU 1600 of FIG. 16 is associated with the transmission queue 1220 of the AC_VO type shown in FIG. 12. Referring to FIG. 16 and Table 1, the user priority level of the first payload (i.e., MSDU#1) and the user priority level of the second payload (i.e., MSDU#2) may both be set to '6'.

In this case, a traffic identifier (TID) corresponding to '6' may be included in the MAC header 1601 of the MPDU 1600, which is generated based on the first payload (i.e., MSDU#1) and the second payload (i.e., MSDU#2).

As another example, the user priority level of the first payload (i.e., MSDU#1) and the user priority level of the second payload (i.e., MSDU#2) may both be set to '7'.

In this case, a traffic identifier (TID) corresponding to '7' may be included in the MAC header 1601 of the MPDU 1600, which is generated based on the first payload (i.e., MSDU#1) and the second payload (i.e., MSDU#2).

Although it is shown in FIG. 16 that only two encapsulated MSDUs 1610 and 1620 are included in the frame body 1602 of FIG. 16, this is merely exemplary. And therefore, it shall be understood that three or more encapsulated MSDUs may be included in the frame body 1602 within a range that does not exceed the predetermined traffic size.

Figure 17:
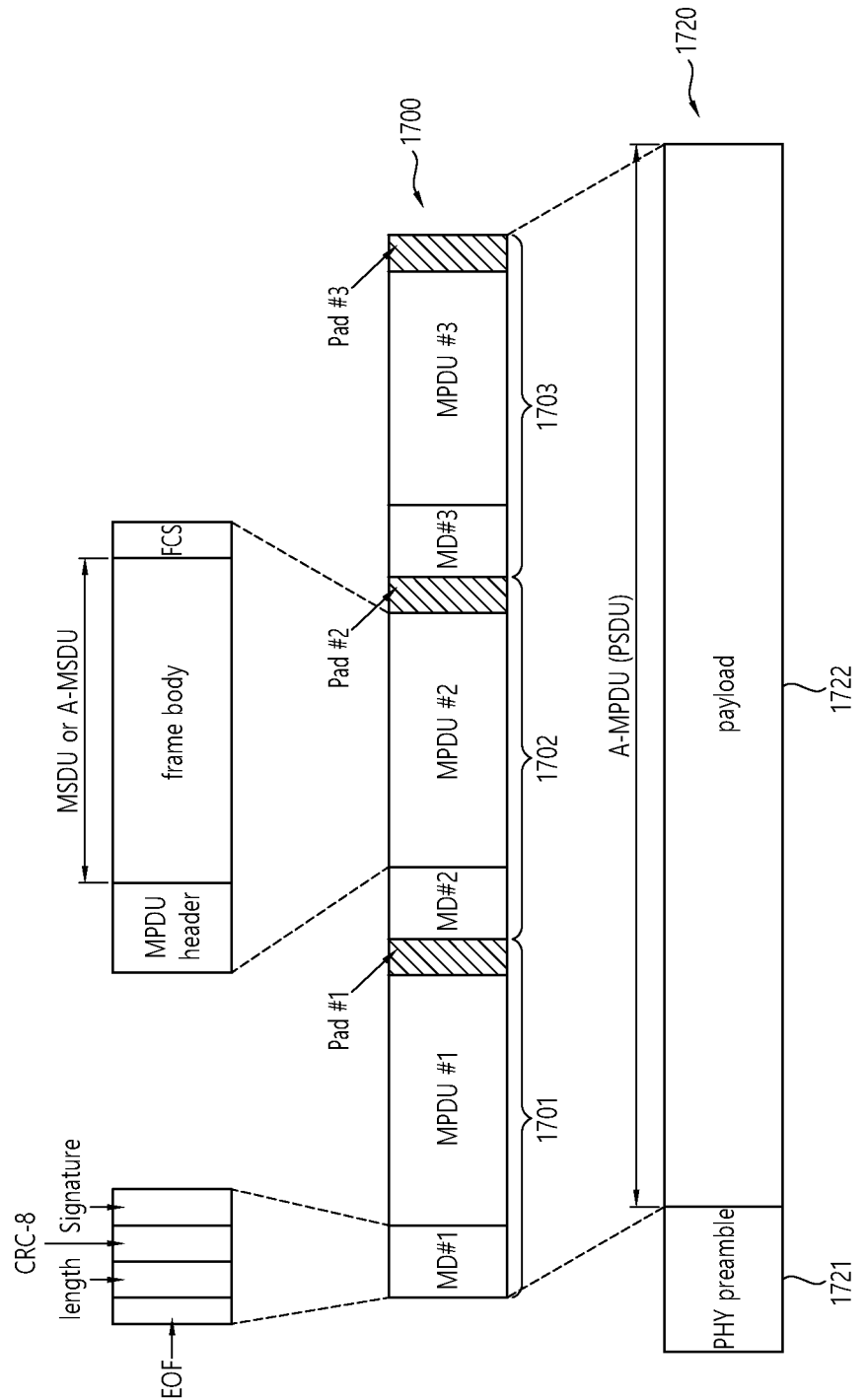
FIG. 17 is a conceptual view illustrating a frame structure of an A-MPDU, wherein a plurality of MPDUs are aggregated, according to an exemplary embodiment of the present invention.

FIG. 17 is a conceptual view illustrating a frame structure of an A-MPDU, wherein a plurality of MPDUs are aggregated, according to an exemplary embodiment of the present invention.

Referring to FIG. 1 to FIG. 17, the wireless device may perform encapsulation operations based on a plurality of MPDUs (e.g., MPDU#1, MPDU#2, MPDU#3). Accordingly, first to third encapsulated MPDUs 1701, 1702, and 1703 may be generated.

For example, each MPDU (e.g., MPDU#1, MPDU#2, and MPDU#3) may have a frame structure corresponding to the above-described MPDU 1600 of FIG. 16.

By logically aggregating a plurality of encapsulated MPDUs 1701, 1702, and 1703 at the bottom of the MAC layer, the wireless device may generate an Aggregated-MPDU (A-MPDU) 1700.

More specifically, the first encapsulated MPDU 1701 may further include a first MPDU delimiter (MD#1) field having a predetermined size and a first pad (Pad#1) field. For example, the first MPDU delimiter (MD#1) field may have a length of 32 bits.

For example, the first MPDU delimiter (MD#1) field may include an End Of Field (hereinafter referred to as EOF) sub-field, a length sub-field being allocated with 12 bits, a CRC-8 sub-field being allocated with 8 bits, and a signature sub-field being allocated with 8 bits. The CRC-8 sub-field may be used for validating the integrity of the first MPDU delimiter (MD#1) field.

Also, in order to be aligned to a subsequent A-MPDU delimiter field (e.g., MD#2), the Pad field (e.g., Pad#1) may be allocated with a variable length ranging from 0 to 3 bytes.

It shall be understood that the detailed description of the second encapsulated MPDU 1702 and the third encapsulated MPDU 1703 may be superseded by the description of the first encapsulated MPDU 1701.

The wireless device may generate a PPDU 1720 based on a PHY preamble 1721 and an A-MPDU 1700. The A-MPDU 1700 may be included in a payload field 1722 of the PPDU 1720, which is used for communication that is based on a physical layer.

All MPDUs (e.g., MPDU#1, MPDU#2, and MPDU#3) being included in the A-MPDU 1700 may be addressed to the same receiver.

According to the related art, each of a plurality of MPDUs (e.g., MPDU#1, MPDU#2, and MPDU#3) may have the same traffic identifier (TID). In other words, according to the related art, the wireless device cannot configure on A-MPDU based on the plurality of MPDUs each having a different traffic identifier (TID).

Figure 18:
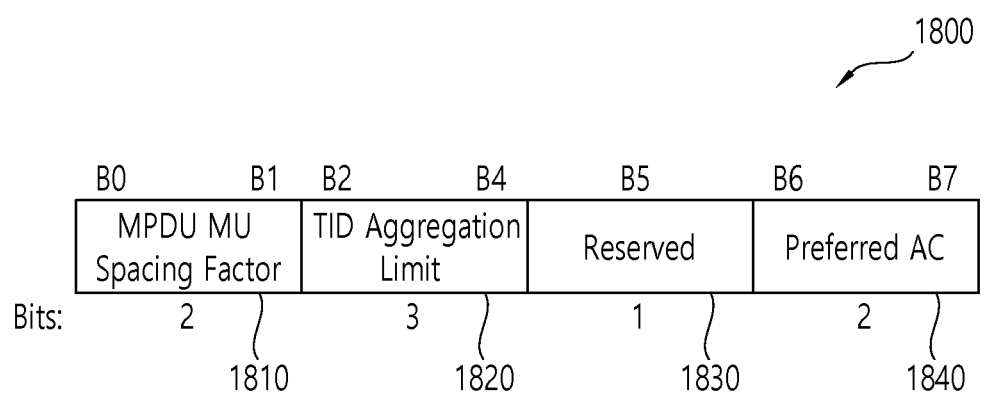
FIG. 18 is a diagram illustrating a field of a basic trigger frame including preference information and limit information according to an exemplary embodiment of the present invention.

FIG. 18 is a diagram illustrating a field of a basic trigger frame including preference information and limit information according to an exemplary embodiment of the present invention.

According to the IEEE 802.11ax standard, the AP may transmit a trigger frame, which individually allocates a plurality of uplink wireless resource for a plurality of user equipments (or user devices). The trigger frame according to the exemplary embodiment of the present invention may be interpreted and understood based on the above-described FIG. 9 to FIG. 11.

For a brief description of FIG. 18, hereinafter, the trigger frame may correspond to a trigger frame of a basic type (hereinafter referred to as a 'basic trigger frame') for allowing the trigger type field 1060 to perform general triggering.

Furthermore, the basic trigger frame may hereinafter be understood as a variant of the trigger frame of the basic type. The basic trigger frame may further include a trigger dependent user information field 1150 in each individual user information field 960#1 to 960#N.

The wireless device according to the exemplary embodiment of the present invention may transmit a trigger-based PPDU as a response to the basic trigger frame. The trigger-based PPDU may be understood as a PPDU (e.g., 1720), which is described above in FIG. 17. An A-MPDU may be included in a payload (e.g., 1722) of the trigger-based PPDU 1720.

According to the exemplary embodiment of the present invention, unlike in the related art, a plurality of MPDUs each having a different traffic identifier (TID) may be included in the trigger-based PPDU, which is transmitted as a response to the basic trigger frame. In the exemplary embodiment of the present invention, the plurality of MPDUs having two or more different types traffic identifiers (TIDs) may be referred to as a Multi-TID A-MPDU.

A dependent field 1800 of FIG. 18 may be understood and interpreted as the trigger dependent user information field 1150, which is individually included in each user information field 960#1 to 960#N shown in FIG. 9.

The dependent field 1800 may include a MPDU Spacing Factor 1810, a TID Aggregation Limit field 1820, a Reserved field 1830, and a Preferred AC field 1840.

The MPDU Spacing Factor 1810 may indicate a value that is to be multiplied by a minimum MPDU start spacing. For example, 2 bits may be allocated for the MPDU Spacing Factor field 1810.

The TID Aggregation Limit field 1820 may include limit information indicating a maximum number of traffic identifiers (TIDs) that are authorized (or allowed) for the A-MPDU. The wireless device may refer to the limit information included in the basic trigger frame and may then configure a Multi-TID A-MPDU. The TID Aggregation Limit field 1820 may be allocated with 3 bits.

For example, a case when the limit information indicates '2' may be assumed. In this case, the wireless device may configure a Multi-TID A-MPDU based on a plurality of MPDUs having one type of traffic identifier (TID).

Additionally, the wireless device may configure a Multi-TID A-MPDU based on a plurality of MPDUs having two types of traffic identifiers (TIDs). However, in case the limit information indicates '2', the wireless device cannot configure a Multi-TID A-MPDU based on a plurality of MPDUs having three types of traffic identifiers (TIDs).

As another example, a case when the limit information indicates '3' may be assumed. In this case, the wireless device may configure a Multi-TID A-MPDU based on a plurality of MPDUs having one type of traffic identifier (TID).

Additionally, the wireless device may configure a Multi-TID A-MPDU based on a plurality of MPDUs having two types of traffic identifiers (TIDs). And, the wireless device may also configure a Multi-TID A-MPDU based on a plurality of MPDUs having three types of traffic identifiers (TIDs).

However, in case the limit information indicates '3', the wireless device cannot configure a Multi-TID A-MPDU based on a plurality of MPDUs having four types of traffic identifiers (TIDs).

As yet another example, when the limit information indicates '1', the wireless device may configure a Multi-TID A-MPDU based on a plurality of MPDUs having one type of traffic identifier (TID). More specifically, in case the wireless device receives a basic trigger frame that is set to '1', it may be understood that the configuration of a Multi-TID A-MPDU is not authorized.

The Reserved field 1830 may include a reserved value of 1 bit.

The Preferred AC field 1840 may include preference information indicating an AC type for an A-MPDU that is to be configured by the wireless device. For example, values (0 to 3) that are expressed based on 2 bits may be mapped as shown below in Table 4.

TABLE 4

| Value | Description |
|---|---|
| 0 | AC_VO |
| 1 | AC_VI |
| 2 | AC_BE |
| 3 | AC_BK |

Hereinafter, a method according to which the wireless device configures an A-MPDU that is to be included in a trigger-based trigger PPDU as a response to a trigger frame, in a case when a Multi-TID A-MPDU is supported, will be described.

A primary AC may refer to an AC type corresponding to a transmission queue being the first to complete the internal backoff operation, which is performed by the wireless device, among the four transmission queues being mapped to each of the four AC types by one-to-one mapping for the wireless device. And, a secondary AC may refer to the remaining AC types excluding the primary AC.

According to the exemplary embodiment of the present invention, in case all of the following first to third conditions are satisfied, the wireless device may configure an A-MPDU based on at least one MPDU corresponding to the primary AC and at least one MPDU corresponding to the secondary AC.

According to a first condition, the wireless device shall include at least one MPDU having a traffic identifier (TID) corresponding to the primary AC of a specific TXOP in the A-MPDU.

According to a second condition, it will be provided that a TXOP limit value corresponding to the primary AC is not equal to '0'.

According to a third condition, it will be provided that no remaining MPDU exists in the transmission queue corresponding to the primary AC, or that no additional MPDU that is to be added exists in the transmission queue corresponding to the primary AC.

Basically, in case the Multi-TID A-MPDU is supported, the wireless device may configure an A-MPDU based on a plurality of MPDUs each having a traffic identifier (TID) corresponding to the primary AC (or a plurality of MPDUs each having a traffic identifier (TID) corresponding to an AC having a priority level that is higher than that of the primary AC).

Moreover, in case the Multi-TID A-MPDU is supported, the wireless device may configure the Multi-TID A-MPDU within a range that does not exceed the maximum number of traffic identifiers (TIDs) for the Multi-TID A-MPDU, the maximum number being indicated by the limit information of the TID Aggregation Limit field 1820.

Referring to FIG. 12, FIG. 18, and Table 4, if the value corresponding to the preference information is equal to '0', the wireless device (e.g., 1200) may include the A-MPDU, which is generated based on the frame 1221 that is included in the transmission queue 1220 corresponding to the AC_VO type, in the trigger based PPDU.

If the value corresponding to the preference information is equal to '1', the wireless device (e.g., 1200) may include the A-MPDU, which is generated based on the frames 1231, 1232, 1233, and 1234 that are included in the transmission queue 1230 corresponding to the AC_VI type, in the trigger based PPDU.

Also, if the value corresponding to the preference information is equal to '1', the wireless device (e.g., 1200) may include the A-MPDU, which is generated based on the frames 1231, 1232, 1233, and 1234 that are included in the transmission queue 1230 corresponding to the AC_VI type and the frame 1221 that is included in the transmission queue 1220 corresponding to the AC_VO type, which has a higher priority level than the AC_VI type, in the trigger based PPDU.

If the value corresponding to the preference information is equal to '2', the wireless device (e.g., 1200) may include the A-MPDU, which is generated based on the frames 1241, 1242, and 1243 that are included in the transmission queue 1240 corresponding to the AC_BE type, in the trigger based PPDU.

Also, if the value corresponding to the preference information is equal to '2', the wireless device (e.g., 1200) may include the A-MPDU, which is generated based on the frames 1241, 1242, and 1243 that are included in the transmission queue 1240 corresponding to the AC_BE type and the frames 1221, 1231, 1232, 1233, and 1234 that are included in the transmission queues 1220 and 1230 having higher priority levels than the AC_BE type, in the trigger based PPDU.

If the value corresponding to the preference information is equal to '3', the wireless device (e.g., 1200) may include the A-MPDU, which is generated based a random frame regardless of the AC type, in the trigger based PPDU.

Hereinafter, for the exemplary embodiment of the present invention, a method according to which the wireless device configures an A-MPDU that is to be included in a trigger-based trigger PPDU as a response to a trigger frame, in a case when a Multi-TID A-MPDU is not supported, will be described.

Basically, in case the Multi-TID A-MPDU is not supported, the wireless device may select any one of two different types of traffic identifiers (TIDs) corresponding to the AC type, which is indicated by the preference information included in the preferred AC field 1840.

For example, in case the AC type, which is indicated by the preference information included in the preferred AC field 1840, corresponds to AC_VO, the wireless device may select any one of '6' and '7', which correspond to the traffic identifiers (TIDs) corresponding to the AC_VO type for the configuration of the A-MPDU.

In case '7' is selected as the traffic identifier (TID), the wireless device may generate an A-MPDU by aggregating only the MPDUs having the traffic identifier (TID) corresponding to '7', among the plurality of MPDUs included in the transmission queue corresponding to the AC_VO type.

Additionally, in case the Multi-TID A-MPDU is not supported, the wireless device may configure an A-MPDU based on the limit information included in the TID aggregation limit field 1820. Since this corresponds to a case when the Multi-TID A-MPDU is not supported, the limit information included in the TID aggregation limit field 1820 may be set to '1'.

According to the exemplary embodiment of the present invention, even if the limit information included in the aggregation limit field 1820 is set to '1', the wireless device may add a MPDU having a random traffic identifier (TID) to an A-MPDU that is generated in advance (i.e., a pre-generated A-MPDU).

The pre-generated A-MPDU may be generated based on a plurality of MPDUs having one type of traffic identifier (TID). The MPDU having a random traffic identifier (TID) according to the exemplary embodiment of the present invention may correspond to a QoS data frame or a QoS null frame that is configured so that a separate acknowledgement (ACK) is not required by the AP.

For example, information associated with an ACK policy that does not require a separate ACK frame the AP (hereinafter referred to as a 'No ACK Policy') may be included in the MAC header of the QoS data frame (e.g., QoS control field 1518) or the MAC header of the QoS null frame (e.g., QoS control field 1518).

More specifically, even if a maximum number (i.e., '1') of traffic identifiers (TIDs) indicated by the limit information is exceeded, the MPDU of the No ACK Policy having a random traffic identifier (TID) may be added to the pre-generated A-MPDU.

For reference, the configuration of the Multi-TID A-MPDU may not be authorized through a Multi-TID Aggregation Support field or an ACK Enabled Multi-TID Support field of a HE Capabilities element.

Additionally, according to the exemplary embodiment of the present invention, even if the preference information included in the AC field 1840 indicates a specific AC type, the wireless device may add a MPDU having a random traffic identifier (TID) to the pre-generated A-MPDU.

The pre-defined A-MPDU may be generated based on a plurality of MPDUs each having a specific traffic identifier (TID) corresponding to the specific AC type. The MPDU having the random traffic identifier (TID) according to the exemplary embodiment of the present invention may correspond to the QoS data frame or the QoS null frame, which is configured so that a separate ACK is not required by the AP.

For example, information that is associated with the ACK policy according to which a separate ACK is not required by the AP may be included in the MAC header of the QoS data frame (e.g., QoS control field 1518) or the MAC header of the QoS null frame (e.g, QoS control field 1518).

More specifically, even if the MPDU corresponds to an MPDU being included in an AC type other than the AC type that is indicated by the preference information (or even if the MPDU corresponds to an MPDU being included in an AC type having a lower priority level than the AC type that is indicated by the preference information), the MPDU of the No ACK policy having a random traffic identifier (TID) may be added to the pre-generated A-MPDU.

According to the exemplary embodiment of the present invention, the MPDU of the No ACK policy having a random traffic identifier (TID) and the Multi-TID A-MPDU being generated based on the pre-generated A-MPDU may be included in the payload field of the PPDU.

Generally, the AP shall acknowledge the plurality of traffic identifiers (TIDs) that are included in the Multi-TID A-MPDU. If an excessively wide range of traffic identifiers (TIDs) are included in the Multi-TID A-MPDU, the performance of the system may be degraded due to an overhead, which is caused by the transmission of ACK frames (or BA frames) for the acknowledgement.

However, according to the exemplary embodiment of the present invention, the MPDU of the No ACK policy is not required to perform any separate acknowledgement operations. Therefore, the MPDU of the No ACK policy (e.g., MPDU including the No ACK policy information, which includes BSR information) may be included to the pre-generated A-MPDU without generating any additional overhead. Accordingly, a wireless system having an enhanced performance may be provided.

Although it is not shown in FIG. 18, according to another exemplary embodiment of the present invention, a MPDU (e.g., 1500) having a random traffic identifier (TID) may correspond to a QoS null frame that does not include any payload in its frame body field (e.g., 1520).

Referring to Table 3, which is presented above, if the fifth bit (Bit4) of the QoS control field 1518 of the QoS null frame is set to '1', Queue Size information of a transmission queue corresponding to a traffic, which is to be transmitted by the STA, may be included in the ninth bit to the sixteenth bit (Bit8 to Bit15).

According to the other exemplary embodiment of the present invention, the Queue Size information of a transmission queue corresponding to a traffic that is to be transmitted may be understood as a Buffer Status Report (hereinafter referred to as a 'BSR'). The MPDU including the Buffer Status Report (BSR) information, as described above, may be included in the pre-generated A-MPDU regardless of the priority level of the transmission queue to which the corresponding MPDU belongs (i.e., even if the AC type of the transmission queue including the corresponding MPDU has a priority level that is lower than the primary AC).

Figure 19:
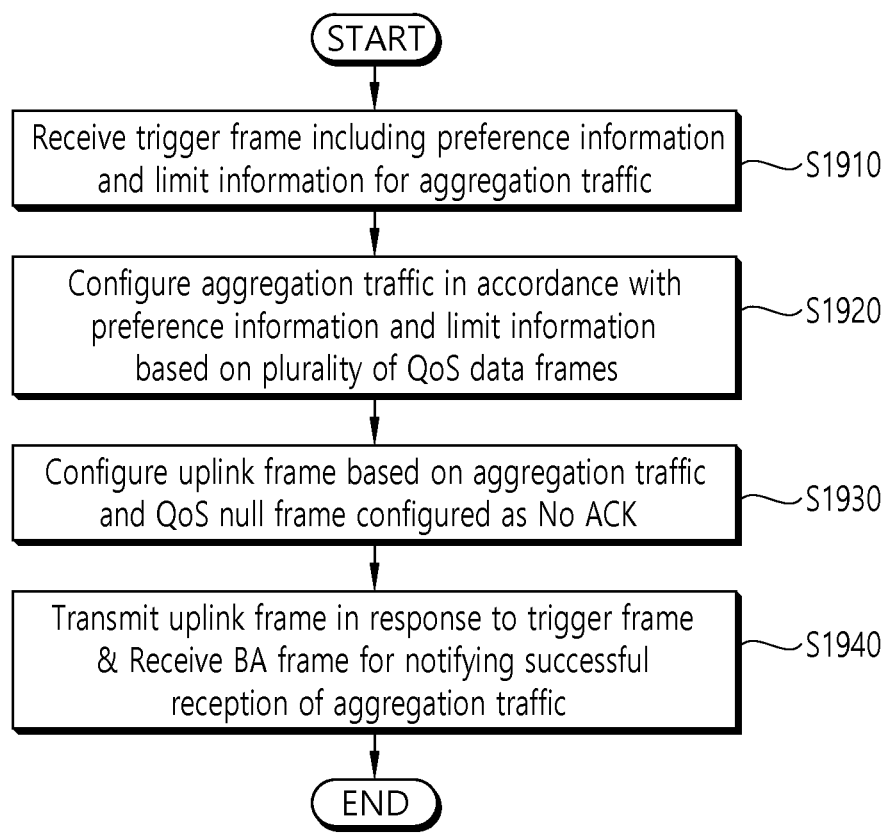
FIG. 19 is a flow chart illustrating a method for transmitting an uplink frame in a wireless LAN system according to an exemplary embodiment of the present invention.

FIG. 19 is a flow chart illustrating a method for transmitting an uplink frame in a wireless LAN system according to an exemplary embodiment of the present invention. Referring to FIG. 1 to FIG. 19, in step S1910, a first wireless device (i.e., user STA) may receive a basic trigger frame, which individually allocates a plurality of uplink wireless resources for a plurality of user devices, from a second wireless device (i.e., AP).

In this case, the trigger frame may include preference information indicating an Access Category (AC) type for an aggregation traffic that is to be configured by the first wireless device, and limit information indicating a maximum number of traffic identifiers that are authorized for the aggregation traffic. In FIG. 19, since it is provided that the Multi-TID A-MPDU is not supported, a case when the limit information is set to '1' may be assumed.

The trigger frame of FIG. 19 may be understood and interpreted as a basic trigger frame, wherein the above-described trigger type 1060 is configured as the basic trigger type.

In step S1920, the first wireless device may configure an aggregation traffic in accordance with the preference information and the limit information based on the plurality of Quality of Service (QoS) data frames for the first wireless device. For example, the aggregation traffic of FIG. 19 may be understood as the pre-generated A-MPDU, which is mentioned above in FIG. 16 to FIG. 18.

In step S1930, the first wireless device may configure an uplink frame based on the aggregation traffic and a QoS null frame including ACK policy information, which is configured so that Acknowledgment is not required by the second wireless device.

For example, the uplink frame may be understood as a trigger-based PPDU being transmitted as a response to a trigger frame. In this case, the QoS null frame may be included in the uplink frame regardless of the preference information and the limit information.

In step S1940, the first wireless device may transmit the uplink frame according to the exemplary embodiment of the present invention. Subsequently, the first wireless device may receive a Block ACK (BA) frame notifying a successful reception of the uplink frame from the second wireless device.

More specifically, the BA frame according to the exemplary embodiment of the present invention may be understood as a frame notifying the successful reception of the aggregation traffic, which is included in the uplink frame. The BA frame will be described in more detail later on with reference to the following drawings.

Figure 20:
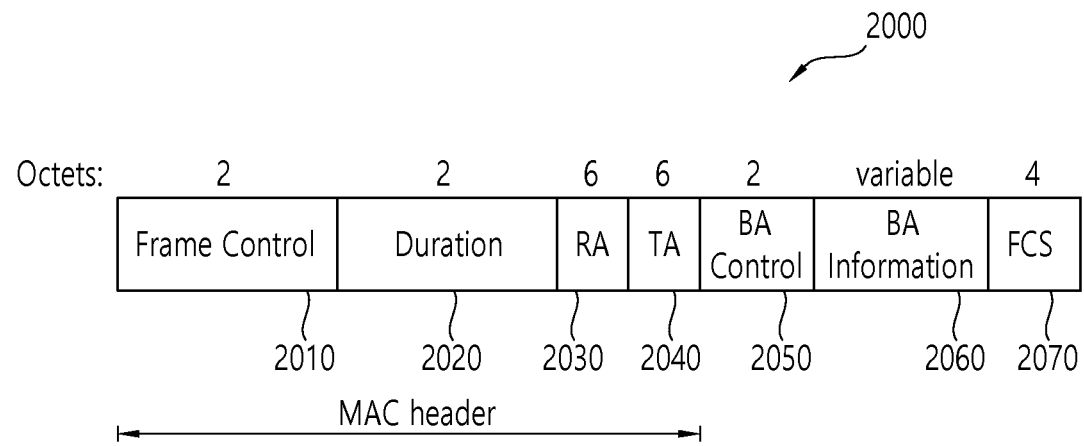
FIG. 20 and FIG. 21 respectively illustrate exemplary formats of a BA frame according to an exemplary embodiment of the present invention.
Figure 21:
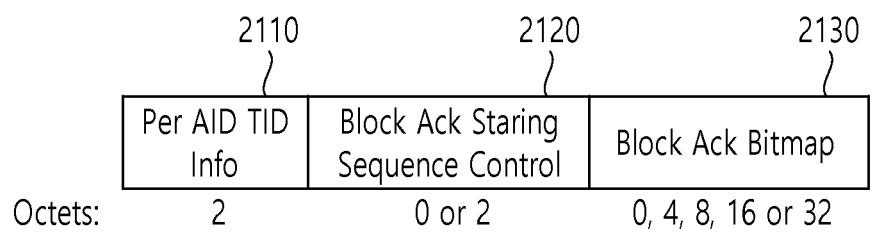

FIG. 20 and FIG. 21 respectively illustrate exemplary formats of a BA frame according to an exemplary embodiment of the present invention. Referring to FIG. 1 to FIG. 21, a BA frame 2000 may include a frame control field 2010, a duration field 2020, a RA field 2030, a TA field 2040, a BA control field 2050, a BA information field 2060, and a FCS field 2070.

Most particularly, the BA control field 2050 may correspond to a shared control field (or a common control field), and the BA information field 2060 may correspond to a user-specific field for individual user STAs. The BA information field 2060 may be individually transported (or delivered) to different user STAs. The BA information field 2060 may be included in sub-fields shown in FIG. 21, which are individually allocated for each user STA.

More specifically, the AP may include identification information (e.g., AID information, ACK scheme information, TID information) for the plurality of user STAs having transmitted a plurality of uplink frames in a Per AID TID Info field 2110, which is shown in FIG. 21.

Additionally, the AP may notify the success or failure in the reception of the MSDU or A-MSDU, which configures a plurality of uplink frames, to each of the user STAs based on a BA starting sequence control field 2120 and a BA bitmap field 2130, which are shown in FIG. 21.

The BA frame 2000 may be understood as the BA frame, which is described above in FIG. 19. More specifically, in order to indicate the successful reception of the plurality of uplink frames, which are transmitted from the plurality of user STAs, to each user STA, the AP may use the BA frame 2000. The BA frame of FIG. 20 is described in more detail in section 9.3.1.9.7 of the standard document IEEE P802.11ax/D1.0, which is disclosed in November, 2016.

Figure 22:
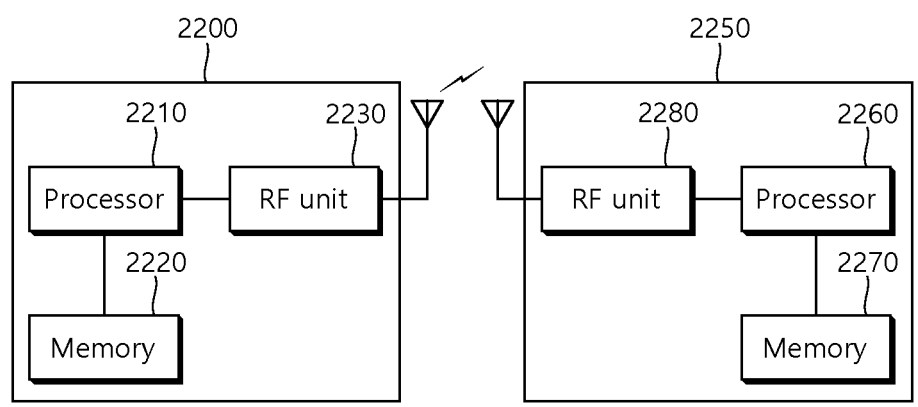
FIG. 22 is a block view illustrating a wireless device to which the exemplary embodiment of the present invention can be applied.

FIG. 22 is a block view illustrating a wireless device to which the exemplary embodiment of the present invention can be applied.

Referring to FIG. 22, as an STA that can implement the above-described exemplary embodiment, the wireless device may correspond to an AP or a non-AP station (STA). The wireless device may correspond to the above-described user or may correspond to a transmitting device transmitting a signal to the user.

The AP 2200 includes a processor 2210, a memory 2220, and a radio frequency (RF) unit 2230.

The RF unit 2230 is connected to the processor 2210, thereby being capable of transmitting and/or receiving radio signals.

The processor 2210 implements the functions, processes, and/or methods proposed in the present invention. For example, the processor 2210 may be implemented to perform the operations according to the above-described exemplary embodiments of the present invention. More specifically, among the operations that are disclosed in the exemplary embodiments of FIG. 1 to FIG. 21, the processor 2210 may perform the operations that may be performed by the AP.

The non-AP STA 2250 includes a processor 2260, a memory 2270, and a radio frequency (RF) unit 2280.

The RF unit 2280 is connected to the processor 2260, thereby being capable of transmitting and/or receiving radio signals.

The processor 2260 implements the functions, processes, and/or methods proposed in the present invention. For example, the processor 2260 may be implemented to perform the operations of the non-AP STA according to the above-described exemplary embodiments of the present invention. The processor may perform the operations of the non-AP STA, which are disclosed in the exemplary embodiments of FIG. 1 to FIG. 21.

The processor 2210 and 2260 may include an application-specific integrated circuit (ASIC), another chip set, a logical circuit, a data processing device, and/or a converter converting a baseband signal and a radio signal to and from one another. The memory 2220 and 2270 may include a read-only memory (ROM), a random access memory (RAM), a flash memory, a memory card, a storage medium, and/or another storage device. The RF unit 2230 and 2280 may include one or more antennas transmitting and/or receiving radio signals.

When the exemplary embodiment is implemented as software, the above-described method may be implemented as a module (process, function, and so on) performing the above-described functions. The module may be stored in the memory 2220 and 2270 and may be executed by the processor 2210 and 2260. The memory 2220 and 2270 may be located inside or outside of the processor 2210 and 2260 and may be connected to the processor 2210 and 2260 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting an uplink frame in a wireless local area network (WLAN) LAN system, the method comprising:
   receiving, by a first wireless device, a basic trigger frame for an uplink multi-user (UL MU) transmission from a second wireless device,
   wherein the basic trigger frame includes preference information related to an Access Category (AC) type for an aggregation frame that is to be generated configured by the first wireless device and limit information related to a maximum number of traffic identifiers allowed for the aggregation frame;
   generating, by the first wireless device, the aggregation frame with a plurality of Quality of Service (QoS) data frames of the first wireless device based on the preference information and the limit information;
   generating, by the first wireless device, the uplink frame based on the aggregation frame and a QoS null frame set to a no acknowledgement (ACK) policy regardless of the preference information and the limit information, wherein the QoS null frame is not required to be acknowledged by the second wireless device based on the no ACK policy; and
   transmitting, by the first wireless device, the uplink frame to the second wireless device in response to the basic trigger frame.

2. The method of claim 1, wherein the first wireless device includes a first transmission queue to a fourth transmission queue for the plurality of QoS data frames,
   wherein the first transmission queue buffers a first QoS data frame related to an AC Voice (AC VO) type having a highest first user priority level among the first transmission queue to the fourth transmission queue,
   wherein the second transmission queue buffers a second QoS data frame related to an AC Background (AC BK) type having a lowest second user priority level among the first transmission queue to the fourth transmission queue,
   wherein the third transmission queue buffers a third QoS data frame related to an AC Video (AC VI) type having a third user priority level lower than the first transmission queue, and
   wherein the fourth transmission queue buffers a fourth QoS data frame related to an AC Best Effort (AC BE) type having a fourth user priority level lower than the third transmission queue.

3. The method of claim 2, wherein the first QoS data frame corresponds to a frame configured of a first traffic identifier or a second traffic identifier having a first transmission priority level higher than the first traffic identifier,
   wherein the second QoS data frame corresponds to a frame configured of a third traffic identifier or a fourth traffic identifier having a second transmission priority level being higher than the third traffic identifier,
   wherein the third QoS data frame corresponds to a frame configured of a fifth traffic identifier or a sixth traffic identifier having a third transmission priority level higher than the fifth traffic identifier, and
   wherein the fourth QoS data frame corresponds to a frame being configured of a seventh traffic identifier or an eighth traffic identifier having a fourth transmission priority level higher than the seventh traffic identifier.

4. The method of claim 3, wherein, when the limit information is set to a value corresponding to '1', the aggregation frame includes only a QoS data frame related to any one traffic identifier selected by the first wireless device among the first traffic identifier to the eighth traffic identifier.

5. The method of claim 2, wherein the QoS null frame includes Buffer Status Report information for a queue size of any one of the first transmission queue to the fourth transmission queue.

6. The method of claim 1, further comprising:
   receiving, by the first wireless device, a block acknowledgement (ACK) frame notifying a successful reception of the aggregation frame from the second wireless device.

7. The method of claim 1, wherein a trigger type of the basic trigger frame is configured as a basic type, and
   wherein the uplink frame is included in a trigger-based physical layer protocol data unit (TB PPDU).

8. The method of claim 1, wherein each of the QoS data frames includes a payload, wherein the QoS null frame corresponds to a frame not including a payload, and wherein a Medium Access Control (MAC) header of the QoS null frame includes control information related to the no ACK policy.

9. The method of claim 1, wherein the QoS null frame is included in the uplink frame regardless of whether or not the QoS null frame is a frame corresponding to a specific AC type indicated by the preference information.

10. The method of claim 1, wherein the QoS null frame is included in the uplink frame regardless of whether or not the maximum number of the traffic identifiers allowed by the limit information is exceeded by adding the QoS null frame.

11. A first wireless device using a method for transmitting an uplink frame in a wireless LAN system, the first wireless device comprising:

a transceiver transceiving radio signals; and a processor operatively connected to the transceiver, wherein the processor is configured to:

receive a basic trigger frame for an uplink multi-user (UL MU) transmission from a second wireless device, wherein the basic trigger frame includes preference information related to an Access Category (AC) type for an aggregation frame that is to be generated by the first wireless device and limit information related to a maximum number of traffic identifiers allowed for the aggregation frame, generate the aggregation frame with a plurality of Quality of Service (QoS) data frames of the first wireless device based on the preference information and the limit information, generate the uplink frame based on the aggregation frame and a QoS null frame set to a no acknowledgement (ACK) policy regardless of the preference information and the limit information, wherein the QoS null frame is not required to be acknowledged by the second wireless device based on the no ACK policy, and transmit the uplink frame to the second wireless device in response to the basic trigger frame.

* * * * *